(12) United States Patent
Inaba et al.

(10) Patent No.: US 9,441,865 B2
(45) Date of Patent: Sep. 13, 2016

(54) HEAT PUMP CYCLE FOR A VEHICLE UTILIZING A VARIABLE OPENING THROTTLE VALVE FOR HUMIDIFYING OPERATION

(75) Inventors: Atsushi Inaba, Okazaki (JP); Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 339 days.

(21) Appl. No.: 13/983,967

(22) PCT Filed: Feb. 10, 2012

(86) PCT No.: PCT/JP2012/000901
§ 371 (c)(1),
(2), (4) Date: Aug. 6, 2013

(87) PCT Pub. No.: WO2012/108211
PCT Pub. Date: Aug. 16, 2012

(65) Prior Publication Data
US 2013/0312447 A1 Nov. 28, 2013

(30) Foreign Application Priority Data

Feb. 11, 2011 (JP) .................................. 2011-027992
Jan. 27, 2012 (JP) .................................. 2012-015130

(51) Int. Cl.
*F25B 30/02* (2006.01)
*F25B 43/00* (2006.01)
(Continued)

(52) U.S. Cl.
CPC ........... *F25B 30/02* (2013.01); *B60H 1/00921* (2013.01); *F24F 3/153* (2013.01);
(Continued)

(58) Field of Classification Search
CPC ........ F25B 43/00; F25B 49/02; F25B 30/02; F25B 41/062; F24F 3/153; F24F 11/006; B60H 1/00921
See application file for complete search history.

(56) References Cited

U.S. PATENT DOCUMENTS 5,526,650 A 6/1996 Iritani et al.
5,598,887 A 2/1997 Ikeda et al.
(Continued)

FOREIGN PATENT DOCUMENTS

JP 2002-81779 3/2002
JP 2002-81779 A 3/2002
(Continued)

OTHER PUBLICATIONS

Office Action dated Feb. 10, 2015 in corresponding Korean Application No. 10-2013-7021068.
(Continued)

*Primary Examiner* — Allen Flanigan
*Assistant Examiner* — Filip Zec
(74) *Attorney, Agent, or Firm* — Harness, Dickey & Pierce, P.L.C.

(57) ABSTRACT

A heat pump cycle is capable of switching an operation mode to a cooling operation mode, a heating operation mode and a dehumidifying-heating operation mode, and is applicable to an air conditioning device. The heat pump cycle is configured to set both of a high-pressure side pressure reducing device and a low-pressure side pressure reducing device—in a throttled state and a fully open state. In this way, the heat pump cycle realizes cooling, heating, and dehumidifying-heating by a simple structure without providing separate refrigerant flow passages extended from a compressor to an outside heat exchanger based on the operation modes of the air conditioning device.

22 Claims, 17 Drawing Sheets

COOLING OPERATION MODE / DEHUMIDIFYING-HEATING OPERATION MODE

(51) Int. Cl.
  *B60H 1/00* (2006.01)
  *F24F 3/153* (2006.01)
  *F24F 11/00* (2006.01)
  *F25B 49/02* (2006.01)

(52) U.S. Cl.
  CPC ............ *F24F 11/006* (2013.01); *F25B 43/00* (2013.01); *F25B 49/02* (2013.01); *F24F 2011/0064* (2013.01); *F25B 2400/02* (2013.01); *F25B 2400/0409* (2013.01); *F25B 2400/0411* (2013.01)

(56) References Cited

U.S. PATENT DOCUMENTS

| | | |
|---|---|---|
| 5,704,219 A | 1/1998 | Suzuki et al. |
| 5,752,391 A | 5/1998 | Ozaki et al. |
| 5,934,094 A | 8/1999 | Itoh et al. |
| 6,042,016 A * | 3/2000 | Ikeda ................. B60H 1/00007 237/12.3 C |
| 6,047,770 A * | 4/2000 | Suzuki ............... B60H 1/00007 165/202 |
| 6,189,323 B1 * | 2/2001 | Nakamura .............. F25B 41/04 137/595 |
| 6,347,528 B1 * | 2/2002 | Iritani ................ B60H 1/00357 62/323.1 |
| 6,920,922 B2 * | 7/2005 | Takeuchi ........... B60H 1/00921 165/202 |

FOREIGN PATENT DOCUMENTS

| | | |
|---|---|---|
| JP | 2002-89988 A | 3/2002 |
| JP | 2007-71478 A | 3/2007 |
| JP | 2010-281561 A | 12/2010 |

OTHER PUBLICATIONS

Office Action dated Sep. 29, 2014 in corresponding Chinese Application No. 201280008165.2.
Office Action dated Nov. 4, 2014 in corresponding Japanese Application No. 2012-015130.
International Search Report and Written Opinion of the ISA, ISA/JP, mailed Mar. 27, 2012.

* cited by examiner

COOLING OPERATION MODE / DEHUMIDIFYING-HEATING OPERATION MODE

HEATING OPERATION MODE (FIRST HEATING MODE)

HEATING OPERATION MODE (SECOND HEATING MODE)

(a)

(b)

(a)

(b)

COOLING OPERATION MODE

HEATING OPERATION MODE (FIRST HEATING MODE)

HEATING OPERATION MODE (SECOND HEATING MODE)

DEHUMIDIFYING-HEATING OPERATION MODE
(FIRST DEHUMIDIFYING-HEATING MODE)

DEHUMIDIFYING-HEATING OPERATION MODE
(SECOND DEHUMIDIFYING-HEATING MODE)

DEHUMIDIFYING-HEATING OPERATION MODE
(THIRD DEHUMIDIFYING-HEATING MODE)

DEHUMIDIFYING-HEATING OPERATION MODE
(FOURTH DEHUMIDIFYING-HEATING MODE)

(a)

(b)

(a)

(b)

COOLING OPERATION MODE / DEHUMIDIFYING-HEATING OPERATION MODE

HEATING OPERATION MODE (FIRST HEATING MODE)

HEAT PUMP CYCLE FOR A VEHICLE UTILIZING A VARIABLE OPENING THROTTLE VALVE FOR HUMIDIFYING OPERATION

CROSS REFERENCE TO RELATED APPLICATION

This application is based on Japanese Patent Applications No. 2011-027992 filed on Feb. 11, 2011, and No. 2012-015130 filed on Jan. 27, 2012, the contents of which are incorporated herein by reference in its entirety.

TECHNICAL FIELD

The present disclosure relates to a heat pump cycle which can be effectively applied to a refrigeration cycle for a vehicle.

BACKGROUND ART

An electric vehicle widely used in recent years is not provided with an engine (internal combustion engine) for outputting a drive force of running a vehicle and hence does not utilize the waste heat of the engine as a heat source in heating the inside of a vehicle compartment. Hence, an air conditioning device for heating the inside of the vehicle compartment by using a high temperature and high pressure refrigerant discharged from an electric compressor of a heat pump cycle (vapor compression type refrigeration cycle) is known as a vehicular air conditioning device applied to the electric vehicle (see, for example, Patent Documents 1, 2)

In this kind of air conditioning device, when the heat load of the heat pump cycle is increased and the amount of electricity consumed by the electric compressor is increased, as in the heating operation when an outside air temperature is low, the amount of electricity that the electric motor for running the vehicle can consume is decreased. Therefore, in this case, a travel distance of the vehicle will be made shorter.

Hence, in the patent document 2, a so-called gas injection cycle (economized refrigeration cycle) is employed as a heat pump cycle to thereby improve the coefficient of performance (COP) of the cycle, whereby the power consumption of the electric compressor is reduced.

For example, the heat pump cycle of the patent document 2 is provided with: a heat radiator for making a refrigerant, which is discharged from a discharge port of the electric compressor and has high temperature and high pressure, radiate heat; a high-pressure side pressure reducing device and a low-pressure side pressure reducing device for reducing the pressure of the refrigerant flowing out of the heat radiator to thereby expand the refrigerant in two steps; a gas-liquid separator for separating gas and liquid of an intermediate pressure refrigerant having pressure reduced by the high-pressure side pressure reducing device; and an evaporator for evaporating a low pressure refrigerant having the pressure reduced by the low-pressure side pressure reducing device to thereby make the low pressure refrigerant perform a heat absorption action.

A gas-phase refrigerant separated by the gas-liquid separator is mixed with the refrigerant in a compression process which is discharged from an intermediate pressure port of the compressor. Further, the low pressure refrigerant flowing out of the evaporator is separated into gas and liquid by an accumulator and a separated gas-phase refrigerant is sucked from a suction port of the compressor. In this way, the gas injection cycle is constructed.

Further, in the patent document 2, in the heat pump cycle constructing the gas injection cycle, by switching the refrigerant flow passage of the cycle in the heat pump cycle constructing the gas injection cycle, three operation modes of cooling, heating, and dehumidifying-heating are realized.

Specifically, by controlling the amount of heat exchange (the amount of heat absorption and the amount of heat radiation) in the outside heat exchanger for exchanging heat between the outside air and the refrigerant according to the operation mode of the air conditioning device, the respective operation modes are realized.

For example, in the cooling operation, by radiating heat held by the refrigerant to the outside air in the outside heat exchanger, the amount of heat absorption of the refrigerant in the evaporator is secured to thereby cool the blown air to a desired temperature, whereas in the heating operation, by absorbing heat from the outside air in the outside heat exchanger, the amount of heat radiation in the radiator is secured to thereby heat the blown air to a desired temperature.

PRIOR ART DOCUMENT

Patent Document

Patent Document 1: JP-B2-3331765
Patent Document 2: JP-B2-3257361

However, when it is tried to realize three operation modes of cooling, heating, and dehumidifying-heating in the heat pump cycle constructing the gas injection cycle, like the patent document 2, a cycle construction becomes complicated. Hence, in the case where the heat pump cycle is applied to an air conditioning device for a vehicle, the ease of mounting the air conditioning device in the vehicle is likely to be impaired.

For example, in the heat pump cycle described in the patent document 2, in order to make the outside heat exchanger function as a heat absorber or as a heat radiator according to the respective operation modes, the refrigerant flow passage extended from the compressor to the outside heat exchanger is constructed of separate refrigerant flow passages of: a flow passage for making the refrigerant flow through the high-pressure side pressure reducing device and the low-pressure side pressure reducing device; and a flow passage for making the refrigerant flow in such a way as to bypass both of the high-pressure side pressure reducing device and the low-pressure side pressure reducing device, whereby the construction of the heat pump cycle is complicated.

SUMMARY OF THE INVENTION

An object of the present disclosure is to realize cooling, heating, and dehumidifying-heating in a heat pump cycle with a gas injection cycle, by a simple cycle construction.

According to a first example of the present disclosure, a heat pump cycle is capable of switching an operation mode to a cooling operation mode, a heating operation mode and a dehumidifying-heating operation mode, and is applicable to an air conditioning device. The heat pump cycle includes: a compressor sucking, compressing and discharging a refrigerant; a first usage side heat exchanger making a high pressure refrigerant discharged from a discharge port of the compressor exchange heat with air to be blown into a space to be air-conditioned or exchange heat with a heating medium for heating the air; a first pressure reducing portion configured to reduce pressure of the refrigerant flowing out of the first usage side heat exchanger; a gas-liquid separation portion separating gas and liquid of the refrigerant having passed through the first pressure reducing portion; a second pressure reducing portion configured to reduce pressure of a liquid-phase refrigerant separated by the gas-liquid separation portion; an outside heat exchanger making the refrigerant passing the second pressure reducing portion exchange heat with an outside air; a second usage side heat exchanger making the refrigerant exchange heat with the air to be blown into the space and making the refrigerant flow out toward a suction port of the compressor; a third pressure reducing portion reducing pressure of the refrigerant flowing into the second usage side heat exchanger; an intermediate pressure refrigerant passage guiding a gas-phase refrigerant separated by the gas-liquid separation portion to an intermediate pressure port provided in the compressor to thereby mix the gas-phase refrigerant with the refrigerant in a compression process of the compressor; and a refrigerant flow passage switching device switching a refrigerant flow passage of the refrigerant circulated in the cycle. In the heat pump cycle, each of the first pressure reducing portion and the second pressure reducing portion is configured to be set not only in a throttled state in which each of the first pressure reducing portion and the second pressure reducing portion performs a pressure reducing operation but also in a fully open state in which each of the first pressure reducing portion and the second pressure reducing portion does not perform the pressure reducing operation.

According to this example, at least a refrigerant flow passage extending from the compressor to the outside heat exchanger is not required to be separately provided according to the operation modes of the air conditioning device, but the amount of heat exchange (the amount of heat absorption and the amount of heat radiation) between the refrigerant and the outside air in the outside heat exchanger can be regulated according to the respective operation modes such as the cooling, heating and dehumidifying-heating operation modes, by changing the states of the first pressure reducing portion and the second pressure reducing portion.

Hence, in the heat pump cycle constructing the gas injection cycle, the cooling, heating, and dehumidifying-heating operation modes can be realized by a simple cycle construction.

According to a heat pump cycle of a second example of the present disclosure, in the heating operation mode, both of the first pressure reducing portion and the second pressure reducing portion are set in the throttled state. In contrast, in the cooling operation mode, both of the first pressure reducing portion and the second pressure reducing portion are set in the fully open state, and in the humidifying-heating operation mode, at least one of the first pressure reducing portion and the second pressure reducing portion is set in the fully open state.

In this way, by changing the states of the first pressure reducing portion and the second pressure reducing portion according to the respective operation modes, the heat exchange between the refrigerant and the outside air in the outside heat exchanger can be appropriately performed and hence the cooling, heating, and dehumidifying-heating operation modes can be realized by a simple cycle construction.

According to a heat pump cycle of a third example of the present disclosure, in the heating operation mode, the refrigerant flow passage switching device causes the refrigerant discharged from the compressor to flow through the first usage side heat exchanger→the first pressure reducing portion→the gas-liquid separation portion→the second pressure reducing portion→the outside heat exchanger in sequence and causes the gas-phase refrigerant separated by the gas-liquid separation portion to flow into the intermediate pressure refrigerant passage. Furthermore, in the cooling operation mode, the refrigerant flow passage switching device causes the refrigerant discharged from the compressor to flow through the first pressure reducing portion→the gas-liquid separation portion→the second pressure reducing portion→the outside heat exchanger→the third pressure reducing portion →the second usage side heat exchanger in sequence; and in the dehumidifying-heating operation mode, the refrigerant flow passage switching device causes the refrigerant discharged from the compressor to flow through the first usage side heat exchanger→the first pressure reducing portion→the gas-liquid separation portion→the second pressure reducing portion→the outside heat exchanger→the third pressure reducing portion→the second usage side heat exchanger in sequence.

In this case, in the heating operation mode, the heat held by the refrigerant, which is discharged from the discharge port of the compressor and has a high temperature and high pressure, is radiated to the blown air or the heating medium for heating the blown air in the first usage side heat exchanger, so that the space to be air-conditioned can be heated.

Further, in the cooling operation mode, the blown air is cooled in the second usage side heat exchanger, so that the space to be air-conditioned can be cooled. Still further, in the dehumidifying-heating operation mode, the blown air is cooled in the second usage side heat exchanger and the blown air is heated in the first usage side heat exchanger, so that the space to be air-conditioned can be dehumidified and heated.

Furthermore, according to the heat pump cycle of the fourth example of the present disclosure, the refrigerant flow passage switching device may be configured to include an intermediate pressure side opening/closing valve for opening and closing the intermediate pressure refrigerant passage. In this case, by opening and closing the intermediate pressure refrigerant passage by the use of the intermediate pressure side opening/closing valve, the heat pump cycle can be switched between the gas injection cycle and the normal cycle (one-step compression cycle).

The present inventors found that in the cooling operation mode and the dehumidifying-heating operation mode, the normal cycle, in which the intermediate pressure refrigerant passage is closed, is more appropriate than the gas injection cycle realized by opening the intermediate pressure refrigerant passage.

For example, in a heat pump cycle according to a fifth example of the present disclosure, the intermediate pressure side opening/closing valve may be configured to open the intermediate pressure refrigerant passage when both of the first pressure reducing portion and the second pressure reducing portion are set in the throttled state, and to close the intermediate pressure refrigerant passage when at least one of the first pressure reducing portion and the second pressure reducing portion is set in the fully open state.

According to this, in the heating operation mode, the intermediate pressure refrigerant passage is opened to thereby switch the heat pump cycle to the gas injection cycle, so that the coefficient of performance (COP) of the cycle can be improved.

Further, in the cooling operation mode, the intermediate pressure refrigerant passage is closed to thereby switch the heat pump cycle to the normal cycle, so that the waste energy consumption of the compressor can be reduced.

Still further, in the dehumidifying-heating operation mode, the intermediate pressure refrigerant passage is closed to thereby switch the heat pump cycle to the normal cycle, so that it is not necessary to take into account a change in the amount of heat radiation of the inside condenser caused by a change in the flow rate of the refrigerant flowing through the intermediate pressure refrigerant passage and the temperature of the blown air can be appropriately regulated.

In the heat pump cycle according to the sixth example of the present disclosure, the intermediate pressure side opening/closing valve may be a pressure difference opening/closing valve that is open and closed according to a pressure difference between before and after the second pressure reducing portion, which is set in the fully open state in the dehumidifying-heating operation mode, of the first pressure reducing portion and the second pressure reducing portion.

In this way, if the intermediate pressure side opening/closing valve is constructed of the pressure difference opening/closing valve opened and closed in conjunction with the pressure reducing portion which is set in the fully open state in the dehumidifying-heating operation mode, the switching between the gas injection cycle and the normal cycle can be realized by the simple construction and the simple control technique.

Furthermore, according to the heat pump cycle of the seventh example of the present disclosure, one of the first pressure reducing portion and the second pressure reducing portion may be constructed of a variable throttle mechanism capable of varying a throttle opening, and the third pressure reducing portion may be constructed of a variable throttle mechanism capable of varying a throttle opening. In addition, in the dehumidifying-heating operation mode, the other of the first pressure reducing portion and the second pressure reducing portion may be set in the fully open state, and the one of the first pressure reducing portion and the second pressure reducing portion may have its throttle opening that is changed to decrease in accordance with an increase in a target temperature of air to be blown into the space, and the third pressure reducing portion may have its throttle opening changed to increase in accordance with the increase in the target temperature of air to be blown into the space.

According to this, in the dehumidifying-heating operation mode, the amount of heat radiation and the amount of heat absorption in the outside heat exchanger can be regulated according to a change in the target temperature of the air blown off into the space to be air-conditioned, so that the amount of heat radiation of the refrigerant in the first usage side heat exchanger and the amount of heat absorption of the refrigerant in the second usage side heat exchanger can be appropriately regulated.

Hence, the temperature of the air to be blown off into the space to be air-conditioned in the dehumidifying-heating operation mode can be finely regulated.

Furthermore, in the heat pump cycle according to the seventh example of the present disclosure, the intermediate pressure refrigerant passage may be closed by the intermediate pressure side opening/closing valve in the dehumidifying-heating operation mode.

According to the heat pump cycle of the eighth example of the present disclosure, at least one of the first pressure reducing portion and the second pressure reducing portion may include a fixed throttle having a fixed throttle opening, a fixed throttle bypassing passage through which the refrigerant flows while bypassing the fixed throttle, and a passage opening/closing valve for opening and closing the fixed throttle bypassing passage.

More specially, as in the heat pump cycle of the ninth example of the present disclosure, the first pressure reducing portion may be constructed of a variable throttle mechanism capable of varying a throttle opening, and the second pressure reducing portion may be constructed of a fixed throttle having a fixed throttle opening, a fixed throttle bypassing passage through which the refrigerant bypasses the fixed throttle, and a passage opening/closing valve for opening and closing the fixed throttle bypassing passage.

In this way, if the first pressure reducing portion is constructed of the variable throttle mechanism, the pressure of the refrigerant flowing into the gas-liquid separation portion can be reduced to a desired intermediate pressure by the first pressure reducing part when the heat pump cycle is realized by the gas injection cycle.

Here, when a fixed throttle is employed as a constituent element of the second pressure reducing part, specifically, it is desired to employ a nozzle or an orifice. This is because of the following reason: in these fixed throttles, a throttle passage area is suddenly contracted or expanded, so that the quality fraction dryness of the refrigerant flowing into the fixed throttle and the flow rate of the refrigerant flowing through the fixed throttle can be easily regulated according to a change in the pressure difference between an upstream side and a downstream side (pressure difference between an outlet and an inlet). In other words, it is desired that the second pressure reducing portion is constructed in such a way as to include the fixed throttle in which the throttle passage area is suddenly contracted or expanded.

Furthermore, a heat pump cycle according to a tenth example of the present disclosure may be provided with an accumulator for separating gas and liquid of the refrigerant flowing toward the suction port of the compressor and for causing a separated gas-phase refrigerant to flow into a side of the suction port of the compressor. In this case, the gas-liquid separation portion may have a liquid-phase refrigerant outlet through which a liquid-phase refrigerant just after separation is made to flow out without being stored therein.

According to this, the gas-liquid separation portion is constructed in such a way as to make the separated liquid-phase refrigerant not remain therein but flow out of the liquid-phase refrigerant outlet, so that the gas-liquid separation portion is not used as a construction for storing the separated liquid-phase refrigerant. Hence, the gas-liquid separation portion can be reduced in size and hence the ease of mounting the heat pump cycle constructing the gas injection cycle in the vehicle can be improved.

Further, even if a load variation is caused in the cycle, the accumulator can be made to function as a construction for storing the refrigerant to become excess, so that the cycle can be stably operated.

A heat pump cycle according to an eleventh example of the present disclosure may be provided with an accumulator for separating gas and liquid of the refrigerant flowing toward the suction port of the compressor and for causing a separated gas-phase refrigerant to flow into a side of the suction port of the compressor, and the gas-liquid separation portion may have a liquid-phase refrigerant outlet through which the liquid-phase refrigerant just after separation is made to flow out.

According to this, the gas-liquid separation portion has the liquid-phase refrigerant outlet through which the liquid-phase refrigerant just after separation flows out, so that the gas-liquid separation portion is not used as a portion for storing the separated liquid-phase refrigerant. Hence, the gas-liquid separation portion can be reduced in size and hence the ease of mounting the heat pump cycle constructing the gas injection cycle in the vehicle can be improved and the cycle can be stably operated.

Here, the meaning of "the liquid-phase refrigerant just after separation" includes the liquid-phase refrigerant separated by the gas-liquid separation portion and having a velocity component in a direction flowing out of the gas-liquid separation portion or the liquid-phase refrigerant in which a force applied thereto for the gas-liquid separation is larger than the gravity (for example, in the case of a centrifugal separation type gas-liquid separator, the liquid-phase refrigerant in which a centrifugal force applied thereto for the gas-liquid separation is larger than the gravity). In other words, the meaning of "the liquid-phase refrigerant just after separation" does not include the liquid-phase refrigerant having only a velocity component circulated in a given space in the gas-liquid separation part.

A heat pump cycle according to a 12th example of the present disclosure may be provided with an accumulator for separating gas and liquid of the refrigerant flowing toward the suction port of the compressor and for causing a separated gas-phase refrigerant to flow into a side of the suction port of the compressor, and the gas-liquid separation portion may have a liquid-phase refrigerant outlet through which the liquid-phase refrigerant just after separation is made to flow out. Furthermore, an inner volume of the gas-liquid separation portion is smaller than a volume of an excess refrigerant, which is acquired by subtracting a necessary maximum refrigerant volume when an amount of refrigerant necessary for the cycle to perform a maximum capacity is converted into a liquid-phase refrigerant, from a volume of a charged refrigerant when an amount of refrigerant charged into the cycle is converted into a liquid-phase refrigerant.

According to this example, the inner volume of the gas-liquid separation portion is smaller than the volume of the excess refrigerant, so that the gas-liquid separation portion can be reduced in size and hence the ease of mounting the heat pump cycle constructing the gas injection cycle in the vehicle can be improved and the cycle can be stably operated.

Furthermore, according to a heat pump cycle of a 13th example of the present disclosure, the gas-liquid separation portion may be a centrifugal-separation type gas-liquid separator in which gas and liquid of the refrigerant is separated by a centrifugal force. In this case, it is possible to easily form a gas-liquid separation portion in which the separated liquid phase refrigerant flows out of a liquid-phase refrigerant outlet without being stored therein, a gas-liquid separation portion having a liquid-phase refrigerant outlet through which the liquid-phase refrigerant just after separation flows out, or a gas-liquid separation portion in which an inner volume is smaller than an excess refrigerant volume.

As the flow velocity of the refrigerant is increased, the gas-liquid separator of the centrifugal separation type like this is increased in the gas-liquid separation performance and hence is effectively applied to a heat pump cycle operated under a comparatively high load at a high frequency.

Further, according to a heat pump cycle of a 14th example of the present disclosure, the liquid-phase refrigerant outlet may be positioned on the lower side of the gas-phase refrigerant outlet through which the gas-phase refrigerant separated by the gas-liquid separation portion is made to flow out and a part of the gas-phase refrigerant may be made to flow out together with the liquid-phase refrigerant. According to this, the liquid-phase refrigerant can be made to efficiently flow out of the liquid-phase refrigerant outlet by the use of the action of the gravity and the backpressure of the gas-phase refrigerant.

According to a heat pump cycle of a 15th example of the present disclosure, the liquid-phase refrigerant outlet may be opened and closed by a float valve displaced according to the height of a liquid level of the liquid-phase refrigerant in the gas-liquid separation part. According to this, the float valve opens the liquid-phase refrigerant outlet at the same time when the liquid-phase refrigerant starts to remain in the gas-liquid separation part, whereby a gas-liquid separation portion can be realized in which the liquid-phase refrigerant does not substantially remain.

According to a heat pump cycle of a 16th example of the present disclosure, the gas-liquid separation portion may be a gas-liquid separator of a surface tension type in which the gas and liquid of the refrigerant is separated by the use of the surface tension of the liquid-phase refrigerant. As the flow velocity of the refrigerant is decreased, the gas-liquid separator of the surface tension type like this is increased in the gas-liquid separation performance and hence is effectively applied to a heat pump cycle operated under a comparatively low load at a high frequency.

According to a heat pump cycle of a 17th example of the present disclosure, the quality fraction dryness of the refrigerant flowing into the outside heat exchanger may be 0.1 or less. This can evaporate the liquid-phase refrigerant in the outside heat exchanger and can make the liquid-phase refrigerant surely perform a heat absorption action.

According to an 18th example of the present disclosure, the first usage side heat exchanger may be constructed of a heat exchanger for making the high pressure refrigerant discharged from the discharge port of the compressor exchange heat with the blown air. Alternatively, according to a 19th example of the present disclosure, the first usage side heat exchanger may be constructed of a heat exchanger for making the high pressure refrigerant discharged from the discharge port of the compressor exchange heat with a heating medium for heating the blown air.

According to a 20th example of the present disclosure, in the heating operation mode, the blown air heated in the first usage side heat exchanger may be blown to the space to be air-conditioned. In this case, the heat held by the refrigerant, which is discharged from the discharge port of the compressor and has high temperature and high pressure, is radiated to the blown air, whereby the space to be air-conditioned can be surely heated.

A heat pump cycle of a 21st example of the present disclosure may be provided with a heat exchange capacity regulation portion for regulating a heat exchange capacity of the first usage side heat exchanger, and in the cooling operation mode, by the heat exchange capacity regulation part, the heat exchange capacity in the first usage side heat exchanger may be reduced and the blown air cooled by the second usage side heat exchanger may be blown to the space to be air-conditioned.

According to a heat pump cycle of a 22nd example of the present disclosure, the second usage side heat exchanger may be arranged on the upstream side of the flow of the blown air with respect to the first usage side heat exchanger, and in the dehumidifying-heating operation mode, the blown air cooled by the second usage side heat exchanger may be heated by the first usage side heat exchanger and may be blown to the space to be air-conditioned.

BRIEF DESCRIPTION OF THE DRAWINGS

The above-mentioned object and the other objects and features and advantages of the present disclosure are made clearer by the following detailed descriptions with reference to the accompanying drawings.

MODE FOR CARRYING OUT THE INVENTION (First Embodiment)

A first embodiment of the present disclosure will be described with reference to FIG. 1 to FIG. 13. In the present embodiment, a heat pump cycle 10 of the present disclosure is applied to a vehicular air conditioning device 1 of an electric vehicle that acquires a drive force for running a vehicle from an electric traction motor. The heat pump cycle 10 performs a function of cooling or heating a blown air to be blown into a vehicle compartment of a space to be air-conditioned in the vehicular air conditioning device 1.

Figure 1:
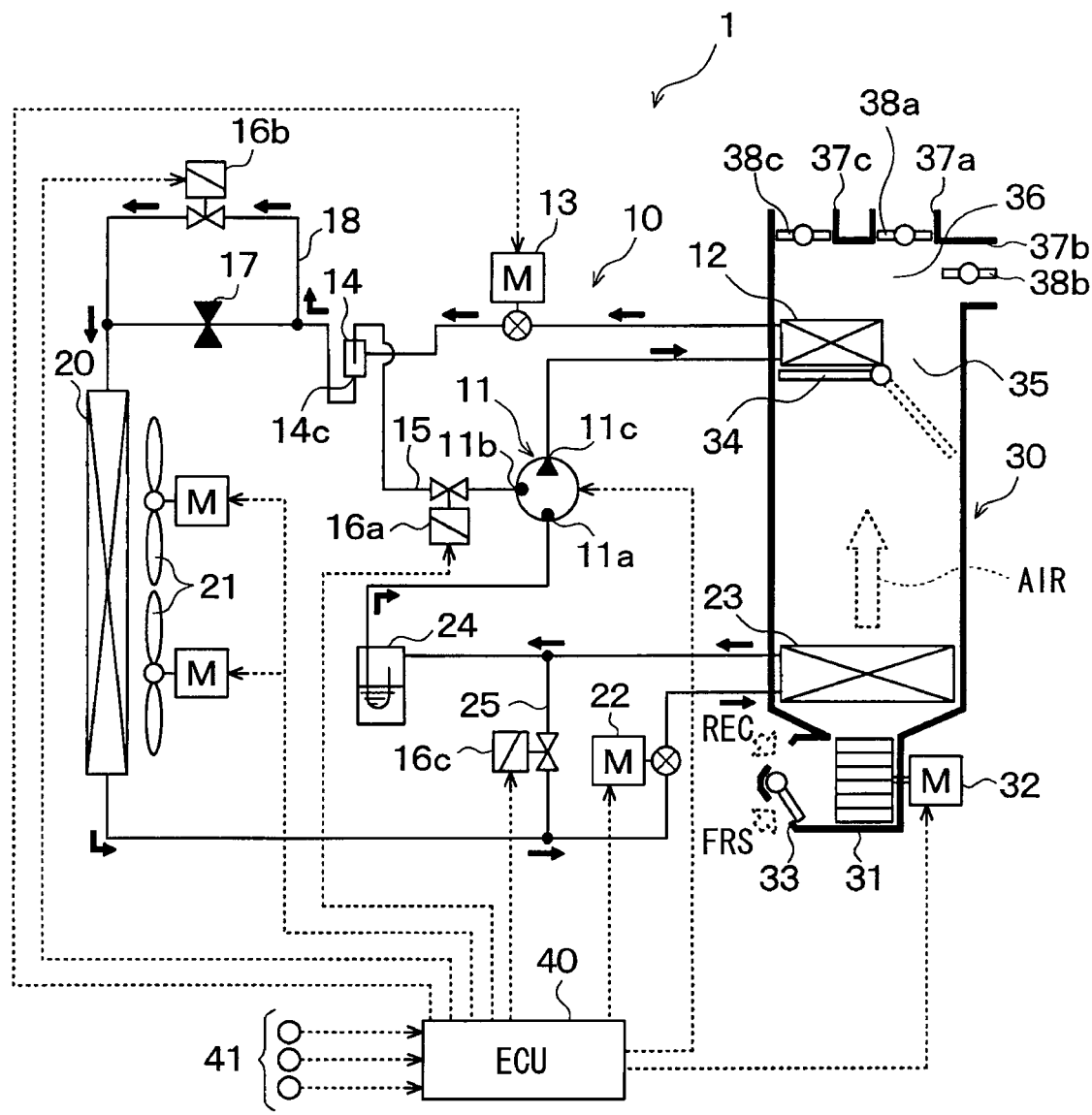
FIG. 1 is a general construction diagram to show a refrigerant flow passage in a cooling operation mode of a heat pump cycle of a first embodiment.
Figure 2:
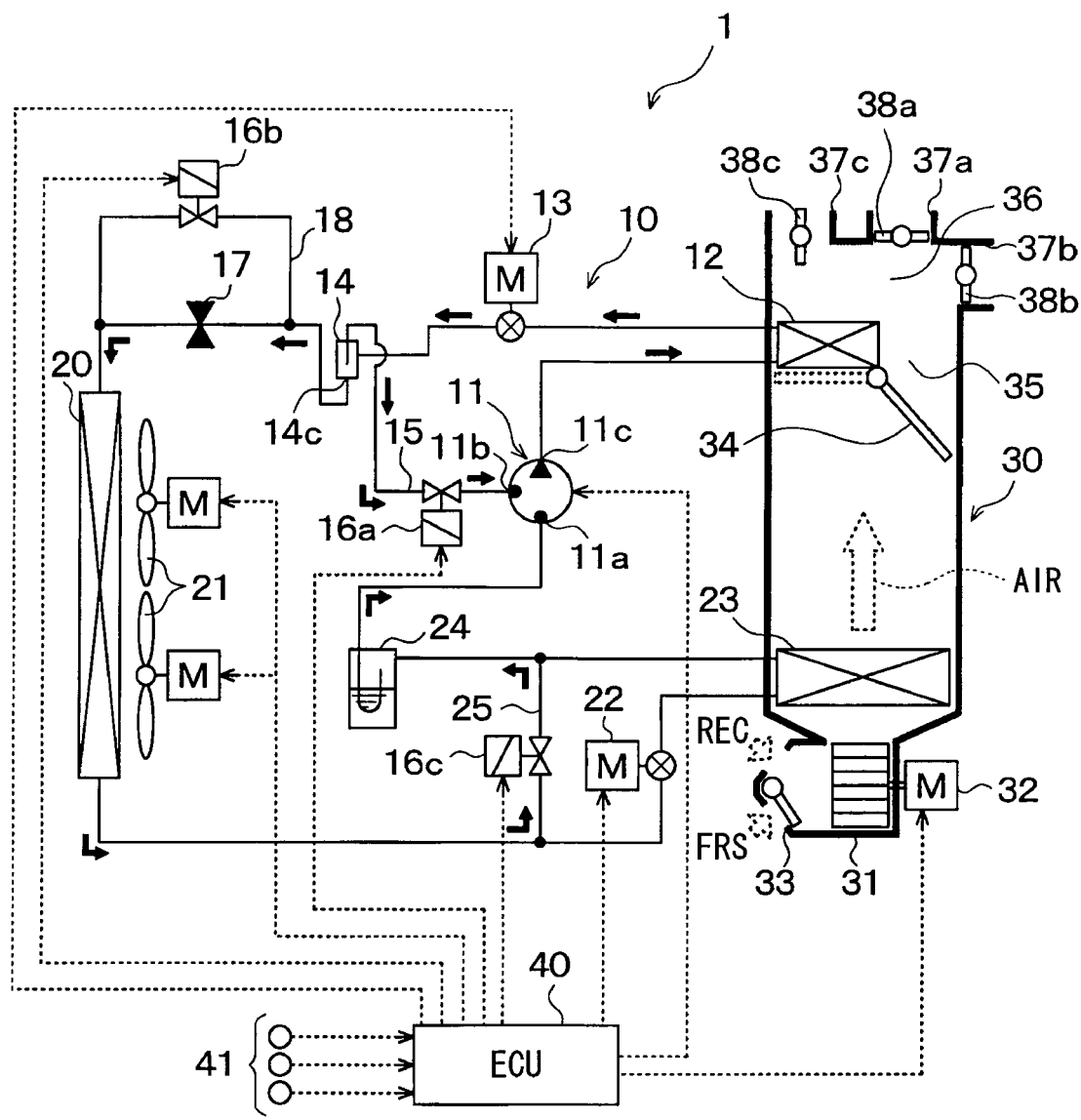
FIG. 2 is a general construction diagram to show a refrigerant flow passage in a first heating mode of the heat pump cycle of the first embodiment.
Figure 3:
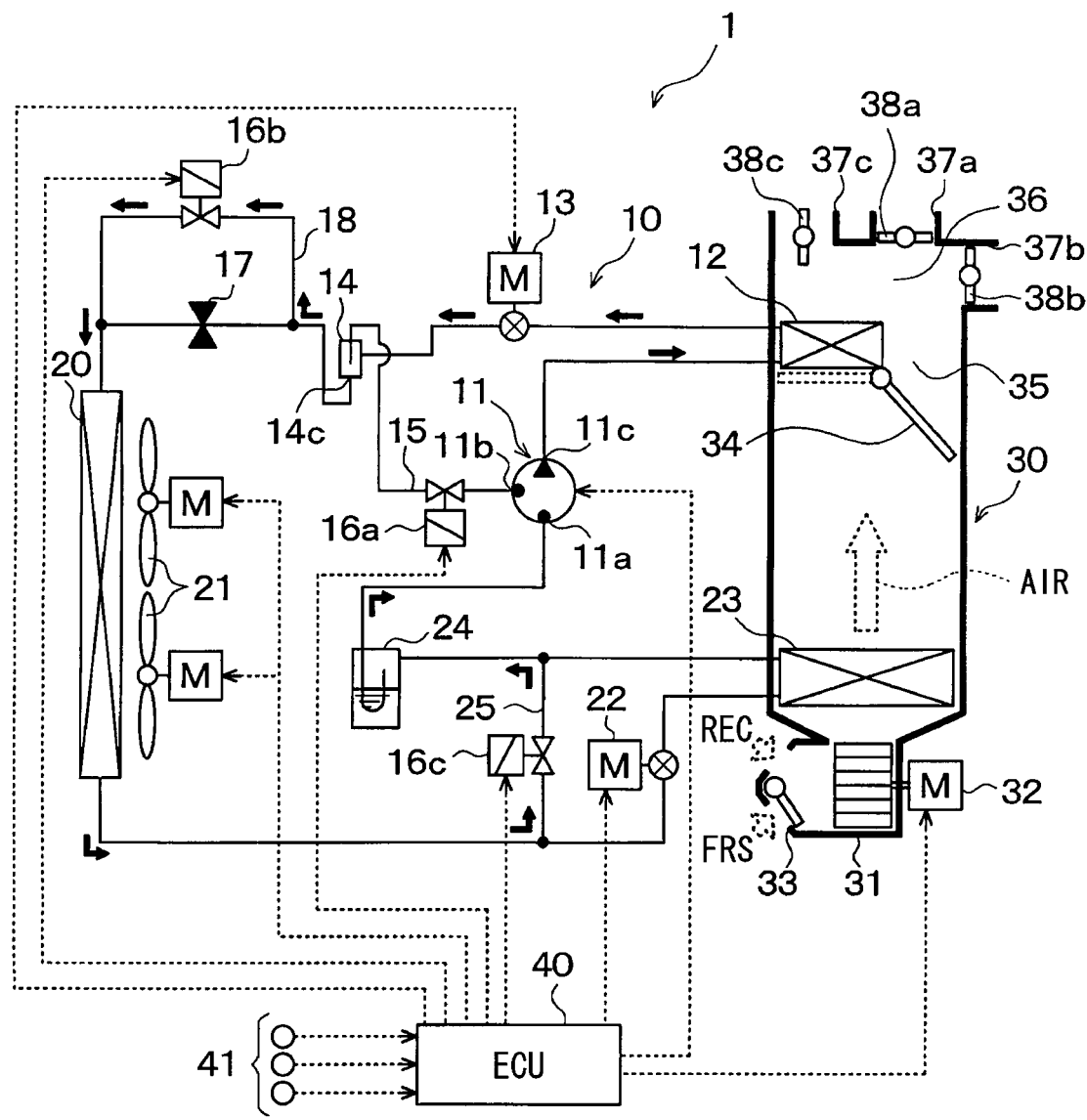
FIG. 3 is a general construction diagram to show a refrigerant flow passage in a second heating mode of the heat pump cycle of the first embodiment.

Hence, the heat pump cycle 10 of the present disclosure is constructed in such a way as to switch between a refrigerant circuit of a cooling operation mode for cooling the inside of the vehicle compartment or a dehumidifying-heating operation mode (dehumidifying operation mode) for dehumidifying and heating the inside of the vehicle compartment, as shown by a general construction diagram in FIG. 1, and a refrigerant circuit of a heating operation mode for heating the inside of the vehicle compartment, as shown by a general construction diagram in FIG. 2 and FIG. 3.

Further, in the heat pump cycle 10, as will be described later, as the heating operation mode can be performed a first heating mode performed when an outside air temperature is extremely low (for example, when the outside air temperature is 0° C. or less) (FIG. 2) and a second heating mode when an ordinary heating operation is performed (FIG. 3). Here, in FIG. 1 to FIG. 3, the flow of a refrigerant in each of the operation modes is shown by solid arrows.

The heat pump cycle 10 employs an HFC-based refrigerant (specifically, R134a) as the refrigerant and constructs a subcritical refrigeration cycle of a vapor compression type in which a high pressure side refrigerant pressure is not larger than a subcritical pressure of the refrigerant. Of course, an HFO-based refrigerant (for example, R1234yf) may be employed. The refrigerant is mixed with a refrigerator oil for lubricating a compressor 11 and a part of the refrigerator oil is circulated in the cycle together with the refrigerant.

In this regard, the amount of refrigerant to be charged is set at an amount acquired by adding a predetermined excess amount to a maximum circulation flow rate necessary to be circulated in the cycle of a high load operation of making the heat pump cycle 10 deliver a maximum refrigeration capacity. The excess amount is determined by taking into account the fact that the refrigerant charged in the cycle will leak to the outside via a rubber hose or other connection parts for connecting the respective constituent parts of the heat pump cycle 10 because of many years of use.

Of the constituent parts of the heat pump cycle 10, the compressor 11 is a part that is arranged in the bonnet of a vehicle and that sucks, compresses, and discharges the refrigerant in the heat pump cycle 10. The compressor 11 is an electric compressor of a two-stage booster type in which two compression mechanisms and an electric motor for rotatively driving both of the compression mechanisms are received in a housing for forming an outer envelope, the two compressor mechanisms being a low pressure side compression mechanism and a high pressure side compression mechanism each of which is constructed of a fixed displacement type compression mechanism.

In the housing of the compressor 11 are formed a suction port 11a through which a low pressure refrigerant is sucked into the low pressure side compression mechanism from the outside of the housing, an intermediate pressure port 11b through which an intermediate pressure refrigerant is made to flow into the housing from the outside of the housing and is mixed with the refrigerant in a compression process, and a discharge port 11c through which a high pressure refrigerant discharged from the high pressure side compression mechanism is discharged to the outside of the housing.

More specifically, the intermediate pressure port 11b is connected to a refrigerant discharge outlet side of the low pressure side compression mechanism (that is, refrigerant suction inlet side of the high pressure side compression mechanism). Further, as the low pressure side compression mechanism and the high pressure side compression mechanism can be employed various types of compression mechanisms such as a scroll type compression mechanism, a vane type compression mechanism, and a rolling piston type compression mechanism.

As to the electric motor, an electric motor having its operation (the number of revolutions) controlled by a control signal outputted from an air conditioning control unit (ECU) 40, which will be described later, and either an AC motor or a DC motor may be employed. A refrigerant discharge capacity of the compressor 11 is changed by controlling the number of revolutions of the electric motor. Hence, the electric motor constructs a discharge capacity change portion of the compressor 11.

In this regard, the present embodiment employs the compressor 11 in which two compression mechanisms are received in one housing, but the type of the compressor is not limited to this. In other words, an electric compressor constructed of one fixed displacement type compression mechanism and an electric motor for rotatively driving the compression mechanism, both of which are received in one housing, can be employed as the compressor 11, if the intermediate pressure refrigerant can be made flow into the electric compressor from the intermediate pressure port 11b and can be mixed with the refrigerant in the compression process.

To the discharge port 11c of the compressor 11 is connected a refrigerant inlet side of an inside condenser 12. The inside condenser 12 is a heat radiator (first usage side heat exchanger) that is arranged in an air conditioning case 31 of an inside air conditioning unit 30 of the vehicular air conditioning device 1, which will be described later, and that makes the high pressure refrigerant discharged from the compressor 11 (specifically, high pressure side compression mechanism) radiate heat to thereby heat air to be blown into a vehicle compartment, the air having passed through an inside evaporator 23 which will be described later.

To a refrigerant outlet side of the inside condenser 12 is connected an inlet side of a high pressure side expansion valve 13 as a high-pressure side pressure reducing device (first pressure reducing part) capable of reducing the pressure of the high pressure refrigerant flowing out of the inside condenser 12 until the high pressure refrigerant becomes the intermediate pressure refrigerant. The high pressure side expansion valve 13 is an electric variable throttle mechanism made of a valve body and configured in such a way that a throttle opening can be varied, and an electric actuator made of a stepping motor for varying the throttle opening of the valve body.

The high pressure side expansion valve 13 is constructed in such a way as to be set in a throttled state in which the high pressure side expansion valve 13 performs a pressure reducing operation and in a fully open state in which the high pressure side expansion valve 13 does not perform the pressure reducing operation. More specifically, in the high pressure side expansion valve 13, at the time of reducing the pressure of the refrigerant, the throttle opening is changed within a range in which a throttle passage area becomes from $\phi 0.5$ to $\phi 3$ mm in equivalent diameter. Further, when the throttle opening is fully open, it is also possible to ensure a throttle passage area of about $\phi 10$ mm in equivalent diameter and hence to inhibit an operation of reducing the pressure of the refrigerant. Moreover, it is also possible to put the throttle opening into a fully closed state and hence close a refrigerant passage from an outside heat exchanger 20 to the inside evaporator 23. In this regard, the high pressure side expansion valve 13 has its operation controlled by a control signal outputted from the air conditioning control unit 40.

To the outlet side of the high pressure side expansion valve 13 is connected a refrigerant flow-in port 14b of a gas-liquid separator 14 as a gas-liquid separation portion for separating the gas and liquid of the intermediate pressure refrigerant flowing out of the inside condenser 12 and having pressure reduced by the high pressure side expansion valve 13. The gas-liquid separator 14 is of a centrifugal separation type in which the gas and liquid of the refrigerant are separated by the action of a centrifugal force.

Figure 4:
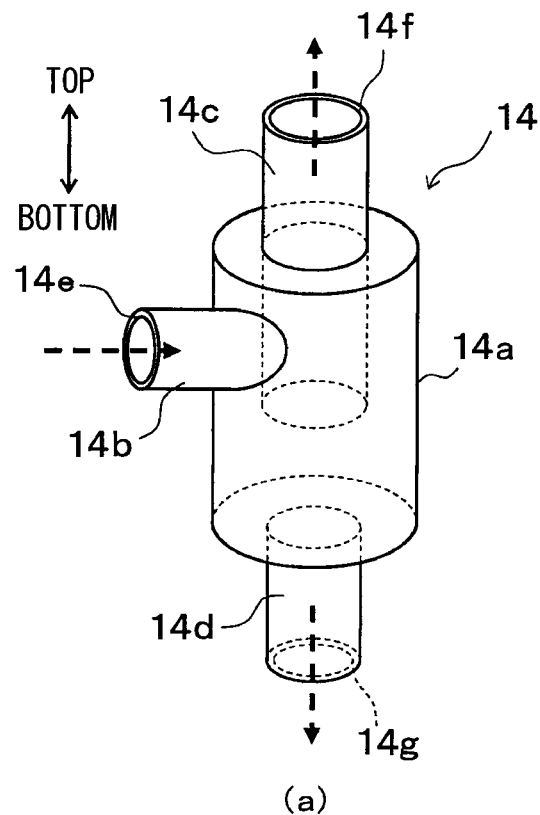
FIG. 4(a) is a perspective view of a gas-liquid separator of the first embodiment and FIG. 4(b) is a top view of the gas-liquid separator of the first embodiment.
Figure 4:
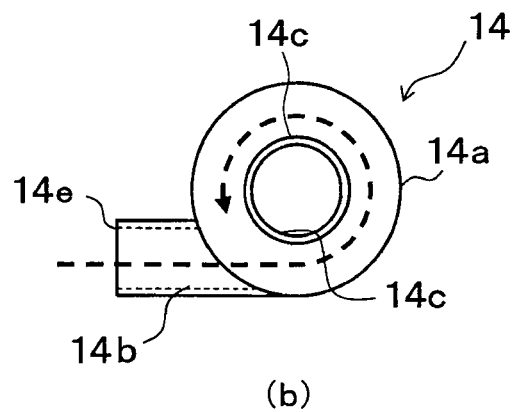
Figure 5:
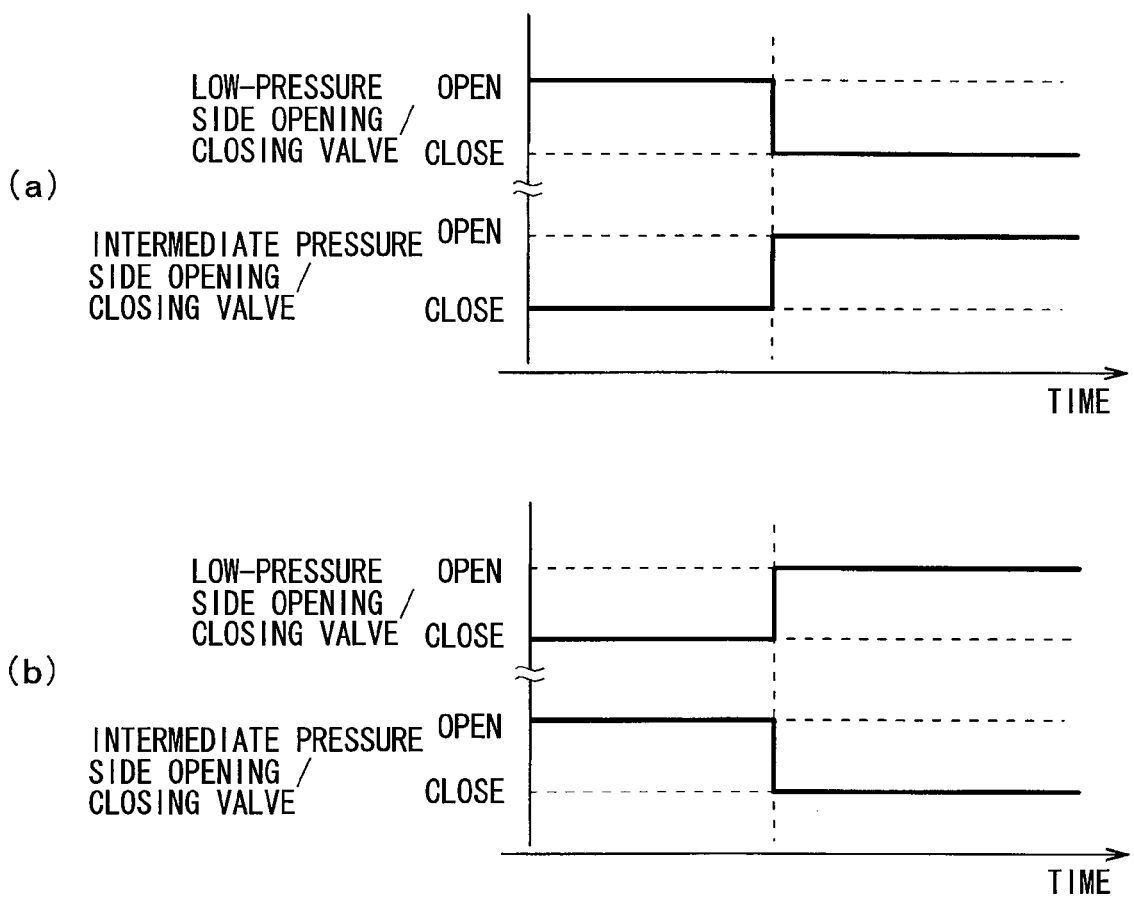
FIGS. 5(a) and 5(b) are illustrations to illustrate an operation of an intermediate pressure side opening/closing valve of the first embodiment.

The detailed construction of the gas-liquid separator 14 will be described by the use of FIG. 4(*a*) and FIG. 4(*b*). FIG. 4(*a*) is a schematic external perspective view of the gas-liquid separator 14 and FIG. 4(*b*) is a top view of the gas-liquid separator 14, when being viewed from above of the gas-liquid separator 14. Up and down arrows in FIG. 4(*a*) and FIG. 4(*b*) designate a top direction and a bottom direction respectively in the state where the gas-liquid separator 14 is mounted in the vehicular air conditioning device 1. This is ditto for the other drawings.

The gas-liquid separator 14 of the present embodiment includes a main body portion 14a extended in a vertical direction and formed nearly in the shape of a hollow cylinder having a closed end (having a circular section); a refrigerant flow-in port 14b having a refrigerant inlet 14e through which the intermediate pressure refrigerant flows in; a gas-phase refrigerant flow-out port 14c having a gas-phase refrigerant outlet 14f through which the separated gas-phase refrigerant flows out; and a liquid-phase refrigerant flow-out port 14d having a liquid-phase refrigerant outlet 14g through which the separated liquid-phase refrigerant flows out.

The diameter of the main body portion 14a is set at a value of about 1.5 or more times to about 3.0 or less times the diameter of a refrigerant pipe connected to the respective refrigerant flow-in port 14b to refrigerant flow-out port 14d, whereby the gas-liquid separator 14 as a whole is reduced in size.

More specifically, the inner volume of the gas-liquid separator 14 (specifically, the main body portion 14a) is set smaller than the volume of an excess refrigerant, which is acquired by subtracting the necessary maximum volume of the refrigerant when the volume of the refrigerant necessary for the cycle to exert a maximum capacity is converted to a liquid phase from the volume of the charged refrigerant when the volume of the refrigerant charged into the cycle is converted to a liquid phase.

For this reason, the inner volume of the gas-liquid separator 14 of the present embodiment is such a small volume as cannot substantially receive the excess refrigerant even if a load variation is caused in the cycle to thereby vary the circulation flow rate of the refrigerant circulated in the cycle.

The refrigerant flow-in port 14b is connected to a cylindrical side face of the main body portion 14a and, as shown in FIG. 4(*b*), is constructed of a refrigerant pipe extended in a tangential direction of an outer circumference of the circular section of the main body portion 14a when the gas-liquid separator 14 is viewed from above. Further, the refrigerant inlet 14e is formed in an end portion opposite to the main body portion 14a of the refrigerant flow-in port 14b. Here, the refrigerant flow-in port 14b does not necessarily need to be extended in a horizontal direction but may be extended with a component in the vertical direction.

The gas-phase refrigerant flow-out port 14c is connected to an upper end face (top face) in an axial direction of the main body portion 14a and is constructed of a refrigerant pipe extended coaxially with the main body portion 14a on the outside and inside of the main body portion 14a. Further, the gas-phase refrigerant outlet 14f is formed in an upper end portion of the gas-phase refrigerant flow-out port 14c, whereas a lower end portion of the gas-phase refrigerant flow-out port 14c is positioned on a lower side than the connection portion of the refrigerant flow-in port 14b and the main body portion 14a.

The liquid-phase refrigerant flow-out port 14d is connected to a lower end face (bottom face) in the axial direction of the main body portion 14a and is constructed of a refrigerant pipe extended downward from the main body portion 14a and coaxially with the main body portion 14a. Further, the liquid-phase refrigerant outlet 14g is formed in a lower end portion of the liquid-phase refrigerant flow-out port 14d.

Hence, the refrigerant flowing in from the refrigerant inlet 14e of the refrigerant flow-in port 14b flows in a swirl along the cylindrical inner wall face of the main body portion 14a and the gas and liquid of the refrigerant is separated by the action of a centrifugal force produced by this swirl flow. Further, the separated liquid-phase refrigerant is dropped to the lower side of the main body portion 14a by the action of gravity.

Then, the liquid-phase refrigerant separated and dropped to the lower side flows out of the liquid-phase refrigerant outlet 14g of the liquid-phase refrigerant flow-out port 14d and the separated gas-phase refrigerant flows out of the gas-phase refrigerant outlet 14f of the gas-phase refrigerant flow-out port 14c. Here, in FIG. 4(a) is shown an example in which the lower end face (bottom face) in the axial direction of the main body portion 14a is formed in the shape of a circular disk. However, the lower portion of the main body portion 14a may be formed in a tapered shape in which a lower portion has its diameter reduced gradually to a lower side and the liquid-phase refrigerant flow-out port 14d may be connected to the lowest portion of the tapered shape.

Further, as shown in FIG. 1 to FIG. 3, an intermediate pressure port 11b of the compressor 11 is connected to the gas-phase refrigerant flow-out port 14c of the gas-liquid separator 14 via an intermediate pressure refrigerant passage 15. The intermediate pressure refrigerant passage 15 has an intermediate pressure side opening/closing valve 16a arranged therein. The intermediate pressure side opening/closing valve 16a is an electromagnetic valve for opening and closing the intermediate pressure refrigerant passage 15 and has its action controlled by a control signal outputted from the air conditioning control unit 40.

The intermediate pressure side opening/closing valve 16a has also the function of a check valve for allowing the refrigerant to flow only to the intermediate pressure port 11b of the compressor 11 from the gas-phase refrigerant outlet of the gas-liquid separator 14 when the intermediate pressure refrigerant passage 15 is opened. In this way, the refrigerant can be prevented from flowing backward from the compressor 11 side to the gas-liquid separator 14 when the intermediate pressure side opening/closing valve 16a opens the intermediate pressure refrigerant passage 15.

Further, the intermediate pressure side opening/closing valve 16a can perform the function of switching a cycle construction (refrigerant flow passage) by opening and closing the intermediate pressure refrigerant passage 15. Hence, the intermediate pressure side opening/closing valve 16a of the present embodiment constructs a refrigerant flow passage switching device for switching a refrigerant flow passage of the refrigerant circulated in the cycle.

The intermediate pressure side opening/closing valve 16a of the present embodiment is constructed in such a way as to open and close the intermediate pressure refrigerant passage 15 in conjunction with the state (throttled state, fully open state) of a low-pressure side pressure reducing device which will be described later.

Specifically, the intermediate pressure side opening/closing valve 16a, as shown in FIG. 5(a), is constructed in such a way as to open the intermediate pressure refrigerant passage 15 when a low pressure side opening/closing valve 16b of the low-pressure side pressure reducing device is closed to thereby put the low-pressure side pressure reducing device into a throttled state. Moreover, the intermediate pressure side opening/closing valve 16a, as shown in FIG. 5(b), is constructed in such a way as to close the intermediate pressure refrigerant passage 15 when the low pressure side opening/closing valve 16b of the low-pressure side pressure reducing device is opened to thereby put the low-pressure side pressure reducing device into a fully open state. Here, FIG. 5(a) shows an operation when the intermediate pressure side opening/closing valve 16a is opened, whereas FIG. 5(b) shows an operation when the low pressure side opening/closing valve 16b is closed.

On the other hand, to the liquid-phase refrigerant flow-out port 14d of the gas-liquid separator 14 is connected an inlet side of the low-pressure side pressure reducing device (second pressure reducing part) capable of reducing the pressure of the refrigerant flowing out of the gas-liquid separator 14, whereas to an outlet side of the low-pressure side pressure reducing device is connected a refrigerant inlet side of the outside heat exchanger 20.

The low-pressure side pressure reducing device of the present embodiment is constructed of: a low pressure side fixed throttle 17 for reducing the pressure of the liquid-phase refrigerant separated by the gas-liquid separator 14 until the liquid-phase refrigerant becomes the low-pressure refrigerant; a fixed throttle bypassing passage 18 for making the liquid-phase refrigerant separated by the gas-liquid separator 14 bypass the low pressure side fixed throttle 17 to thereby guide the liquid-phase refrigerant to the outside heat exchanger 20 side; and the low pressure side opening/closing valve 16b as a passage opening/closing valve for opening and closing the fixed throttle bypassing passage 18. The basic construction of the low pressure side opening/closing valve 16b is equal to the intermediate pressure side opening/closing valve 16a and is an electromagnetic valve having its opening/closing operation controlled by a control voltage (control signal) outputted from the air conditioning control unit 40.

Here, a pressure loss caused when the refrigerant passes through the low pressure side opening/closing valve 16b is extremely smaller than a pressure loss caused when the refrigerant passes through the low pressure side fixed throttle 17. Hence, in the case where the low pressure side opening/closing valve 16b is opened, the refrigerant flowing out of the inside condenser 12 flows into the outside heat exchanger 20 via the fixed throttle bypassing passage 18 side, whereas in the case where the low pressure side opening/closing valve 16*b* is closed, the refrigerant flowing out of the inside condenser 12 flows into the outside heat exchanger 20 via the low pressure side fixed throttle 17.

In this way, by opening and closing the low pressure side opening/closing valve 16*b*, the low-pressure side pressure reducing device can be changed to a throttled state in which the low-pressure side pressure reducing device performs a pressure reducing operation and to a fully open state in which the low-pressure side pressure reducing device does not perform the pressure reducing operation. In this regard, as the low pressure side opening/closing valve 16*b* may be employed an electric three-way valve for switching between a refrigerant circuit for connecting an outlet side of the liquid-phase refrigerant flow-out port 14*d* of the gas-liquid separator 14 to an inlet side of the low pressure side fixed throttle 17 and a refrigerant circuit for connecting an outlet side of the liquid-phase refrigerant flow-out port 14*d* to an inlet side of the fixed throttle bypassing passage 18.

As the low pressure side fixed throttle 17 can be employed a nozzle having a throttle opening fixed or an orifice. In the fixed throttle such as the nozzle and the orifice, the area of a throttle passage is suddenly reduced or suddenly expanded, so that the flow rate of the refrigerant passing through the fixed throttle and the quality fraction dryness X of the refrigerant on the upstream side of the low pressure side fixed throttle 17 can be self-regulated (balanced) with a change in a pressure difference between an upstream side and a downstream side (pressure difference between the inlet side and the outlet side).

Specifically, in the case where the pressure difference is comparatively large, the flow rate of the refrigerant passing through the fixed throttle and the quality fraction dryness X of the refrigerant on the upstream side of the fixed throttle are balanced in such a way that the quality fraction dryness X of the refrigerant on the upstream side of the fixed throttle becomes larger as a necessary circulation refrigerant flow rate required to be circulated in the cycle decreases. On the other hand, in the case where the pressure difference is comparatively small, the flow rate of the refrigerant passing through the fixed throttle and the quality fraction dryness X of the refrigerant on the upstream side of the fixed throttle are balanced in such a way that the quality fraction dryness X of the refrigerant on the upstream side of the fixed throttle becomes smaller as the necessary circulation refrigerant flow rate increases.

However, if the quality fraction dryness of the refrigerant on the upstream side of the low pressure side fixed throttle 17 becomes large, when the outside heat exchanger 20 functions as an evaporator for making the refrigerant perform a heat absorbing action, the amount of heat absorption (refrigeration capacity) of the refrigerant in the outside heat exchanger 20 is decreased and hence the coefficient of performance (COP) of the cycle deteriorates.

Figure 6:
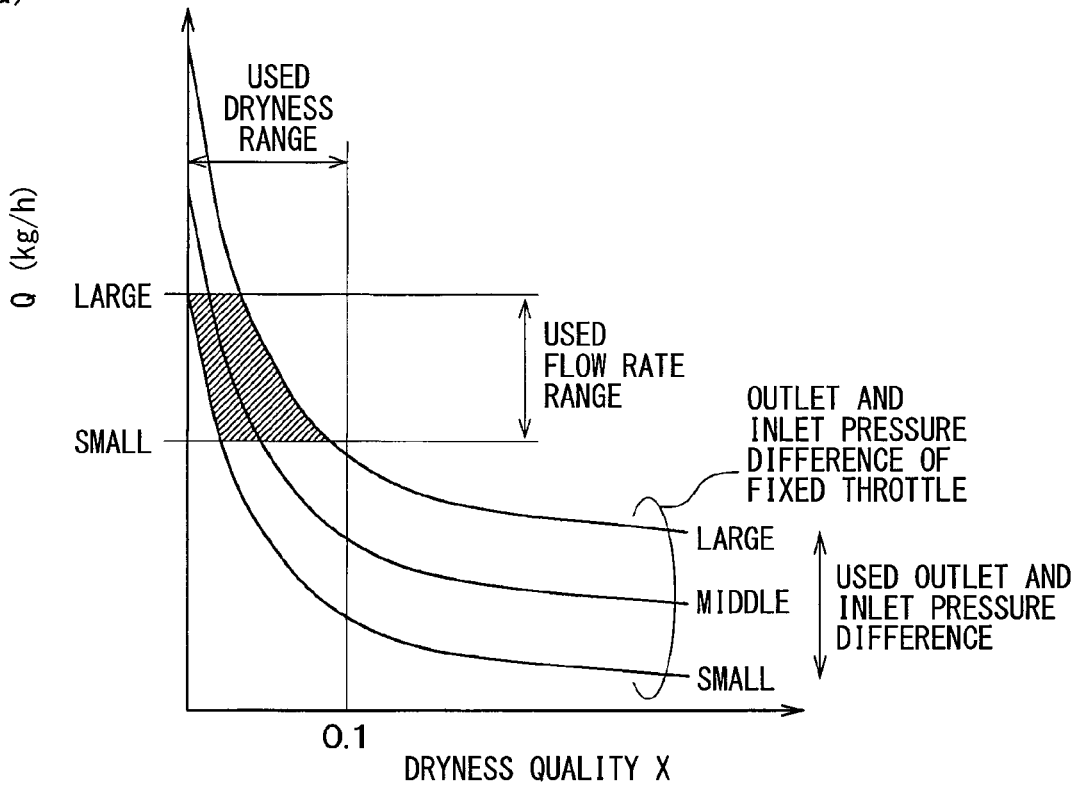
FIG. 6(a) is a graph to show a flow characteristic of a low pressure side fixed throttle constructed of a nozzle or an orifice.
FIG. 6(b) is a graph to show a flow characteristic of a low pressure side fixed throttle constructed of a capillary tube.
Figure 6:
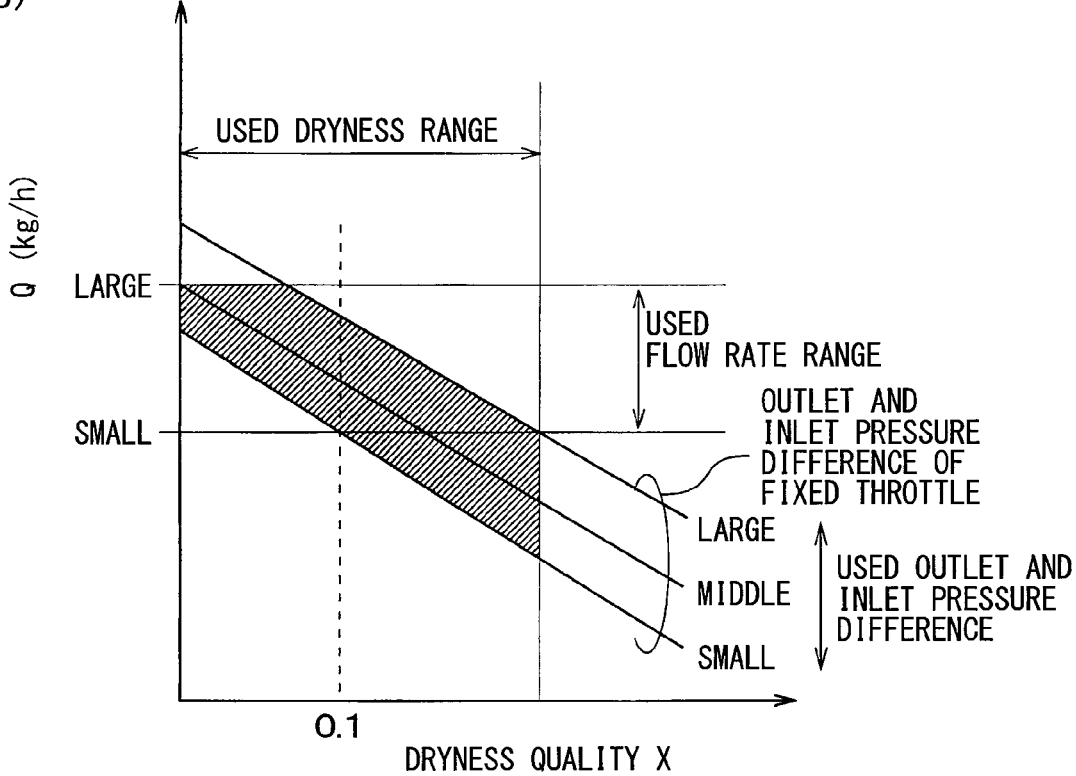

Hence, the present embodiment employs the low pressure side fixed throttle 17 in which even if the necessary circulation refrigerant flow rate is changed by a load variation in the cycle of the heating operation mode, as shown in FIG. 6(*a*), the quality fraction dryness X of the refrigerant on the upstream side of the low pressure side fixed throttle 17 becomes 0.1 or less, thereby preventing the COP from deteriorating. FIG. 6(*a*) is a flow rate characteristic diagram (throttle characteristic diagram) of the low pressure side fixed throttle 17 of the present embodiment and shows a change in a refrigerant circulation flow rate Q with respect to the quality fraction dryness X of the refrigerant on the upstream side of the low pressure side fixed throttle 17 in the heating operation mode.

In other words, the low pressure side fixed throttle 17 of the present embodiment is regulated in such a way that even if the refrigerant circulation flow rate Q and the pressure difference between the outlet and the inlet of the low pressure side fixed throttle 17 are changed within a range to be thought when the load variation is caused in the heat pump cycle 10, as shown by a hatched area in FIG. 6(*a*), the quality fraction dryness X of the refrigerant on the upstream side of the low pressure side fixed throttle 17 becomes 0.1 or less.

Here, it can be thought to employ a capillary tube other than the nozzle or the orifice as the low pressure side fixed throttle 17, but it is desired for the following reason that the nozzle or the orifice is employed as the low pressure side fixed throttle 17.

FIG. 6(*b*) is a flow rate characteristic diagram (throttle characteristic diagram) in the case where a capillary tube is employed as the low pressure side fixed throttle 17 and shows a change in the refrigerant circulation flow rate Q with respect to the quality fraction dryness X of the refrigerant on the upstream side of the low pressure side fixed throttle 17 in the heating operation mode.

As shown in FIG. 6(*b*), in the capillary tube, a change in the refrigerant circulation flow rate Q with respect to the quality fraction dryness X of the refrigerant on the upstream side of the low pressure side fixed throttle 17 is smaller than in the nozzle or the orifice, and hence the quality fraction dryness of the refrigerant on the upstream side of the low pressure side fixed throttle 17 easily becomes large. In other words, when the capillary tube is employed as the low pressure side fixed throttle 17, in the case where the refrigerant circulation flow rate and the pressure difference between the inlet and the outlet of the low pressure side fixed throttle 17 are changed within a range thought when the load variation is caused in the heat pump cycle 10, as shown by a hatched area in FIG. 6(*b*), it is difficult to regulate the quality fraction dryness X of the refrigerant on the upstream side of the low pressure side fixed throttle 17 to be 0.1 or less.

Returning to FIG. 1 to FIG. 3, the outside heat exchanger 20 is a heat exchanger that is arranged in a bonnet and that makes the low pressure refrigerant passing through itself exchange heat with the outside air blown from a blower fan 21. The outside heat exchanger 20 is a heat exchanger that functions as an evaporator for evaporating the low pressure refrigerant to thereby perform a heat absorbing action in the first and the second heating modes and that functions as a heat radiator for making the high pressure refrigerant radiate heat in the cooling operation mode and the like.

To the refrigerant outlet side of the outside heat exchanger 20 is connected the refrigerant inlet side of a cooling expansion valve 22 as a third pressure reducing part. The cooling expansion valve 22 is a valve that reduces the pressure of the refrigerant flowing out of the outside heat exchanger 20 in the cooling operation mode and the like to thereby reduce the pressure of the refrigerant flowing into the inside evaporator 23. The basic construction of the cooling expansion valve 22 is equal to the high pressure side expansion valve 13 and has its action controlled by the control signal outputted from the air conditioning control unit 40.

To the outlet side of the cooling expansion valve 22 is connected the refrigerant inlet side of the inside heat exchanger 23. The inside heat exchanger 23 is an evaporator (second usage side heat exchanger) that is arranged on the upstream side of the flow of the air to be blown into the vehicle compartment of the inside condenser 12 of the air conditioning case 31 of the inside air conditioning unit 30 and that evaporates the refrigerant flowing through itself in the cooling operation mode, the dehumidifying-heating operation mode, and the like to thereby cool the air to be blown into the vehicle compartment.

To the outlet side of the inside heat exchanger 23 is connected the inlet side of an accumulator 24. The accumulator 24 is a low pressure side gas-liquid separator that separates the gas and liquid of the refrigerant flowing into itself and that stores an excess refrigerant. Further, to the outlet side of the gas-phase refrigerant of the accumulator 24 is connected a suction port 11a of the compressor 11. Hence, the inside heat exchanger 23 is connected to the accumulator 24 so as to make the refrigerant flow out to the suction port 11a side of the compressor 11.

Further, to the refrigerant outlet side of the outside heat exchanger 20 is connected an expansion valve bypassing passage 25 for making the refrigerant flowing out of the outside heat exchanger 20 bypass the cooling expansion valve 22 and the inside evaporator 23 to thereby guide the refrigerant to the inlet side of the accumulator 24. The expansion valve bypassing passage 25 has a cooling opening/closing valve 16c arranged therein, such that the cooling opening/closing valve 16c opens and closes the expansion valve bypassing passage 25.

The basic construction of the cooling opening/closing valve 16c is equal to the intermediate pressure side opening/closing valve 16a and has its opening/closing action controlled by a control voltage (control signal) outputted from the air conditioning control unit 40. Further, a pressure loss caused when the refrigerant passes through the cooling opening/closing valve 16c is extremely smaller than a pressure loss caused when the refrigerant passes through the cooling expansion valve 22.

Hence, in the case where the cooling opening/closing valve 16c is opened, the refrigerant flowing out of the outside heat exchanger 20 flows into the accumulator 24 via the expansion valve bypassing passage 25. At this time, the throttle opening of the cooling expansion valve 22 may be fully closed. Further, in the case where the cooling opening/closing valve 16c is closed, the refrigerant flowing out of the outside heat exchanger 20 flows into the inside evaporator 23 via the cooling expansion valve 22. In this way, the cooling opening/closing valve 16c can switch the refrigerant flow passage of the heat pump cycle 10. Hence, the cooling opening/closing valve 16c of the present embodiment constructs a refrigerant flow passage switching device together with the intermediate pressure side opening/closing valve 16a.

Next, the inside air conditioning unit 30 will be described. The inside air conditioning unit 30 has an air conditioning case 31 that is arranged inside an instrument panel disposed at the forefront of the vehicle compartment and that forms an outer envelope of the inside air conditioning unit 30 and in which an air passage of the air to be blown into the vehicle compartment is formed. In the air passage are received a blower 32, the inside condenser 12 and the inside evaporator 23 which have been described above.

On the most upstream side of the air flow of the air conditioning case 31 is arranged an inside/outside air switching portion 33 for switching and introducing air in the vehicle compartment (inside air) and the outside air. The inside/outside air switching portion 33 is a portion that continuously regulates an opening area of an inside air introducing port for introducing the inside air into the air conditioning case 31 and an opening area of an outside air introducing port for introducing the outside air into the air conditioning case 31 by an inside/outside air switching door to thereby continuously change an air volume ratio of the volume of the inside air to the volume of the outside air.

On the downstream side of the air flow of the inside/outside air switching portion 33 is arranged the blower 32 for blowing air sucked via the inside/outside air switching portion 33 to the inside of the vehicle compartment. The blower 32 is an electric blower for driving a centrifugal multi-blade fan (sirocco fan) by an electric motor and has the number of revolutions (air volume) controlled by the control voltage outputted from the air conditioning unit 40.

On the downstream side of the air flow of the blower 32, the inside evaporator 23 and the inside condenser 12 which have been described above are arranged in sequence of the inside evaporator 23→the inside condenser 12 with respect to the flow of the air to be blown into the vehicle compartment. In other words, the inside evaporator 23 is arranged on the upstream side of the air flow with respect to the inside condenser 12.

Further, in the air conditioning case 31 is disposed a bypass passage 35 for making the blown air after passing through the inside evaporator 23 bypass the inside condenser 12, and an air mixing door 34 is arranged on the downstream side of the air flow of the inside evaporator 23 and on the upstream side of the air flow of the inside condenser 12.

The air mixing door 34 is a heat exchange capacity regulating portion for regulating an air volume ratio of the air volume to be passed through the inside condenser 12 out of the blown air passed through the inside evaporator 23 to the air volume to be passed through the bypass passage 35 to thereby regulate a heat exchange capacity of the inside condenser 12. The air mixing door 34 is driven by a servo motor (not shown) whose operation is controlled by the control signal outputted from the air conditioning control unit 40.

Further, on the downstream side of the air flow of the inside condenser 12 and the bypass passage 35 is arranged a mixing space 36 in which the air to be blown into the vehicle compartment, which exchanges heat with the refrigerant in the inside condenser 12 and hence is heated, is mixed with the air to be blown into the vehicle compartment, which passes through the bypass passage 35 and hence is not heated.

On the most downstream side of the air flow of the air conditioning case 31 are arranged opening holes through which the blown air mixed in the mixing space 36 is blown off to the inside of the vehicle compartment of a space to be cooled. Specifically, as the opening holes are formed a defroster opening hole 37a for blowing off an air-conditioned air to an inside face of a front window glass of the vehicle compartment, a face opening hole 37b for blowing off the air-conditioned air to an upper half body of an occupant in the vehicle compartment, and a foot opening hole 37c for blowing off the air-conditioned air to the feet of the occupant.

Hence, by regulating the air volume ratio of the air volume to be passed through the inside condenser 12 to the air volume to be passed through the bypass passage 35 by the air mixing door 34, the temperature of the blown air in the mixing space 36 can be regulated. The air mixing door 34 is driven by a servo motor (not shown) whose operation is controlled by the control signal outputted from the air conditioning control unit 40.

Further, on the upstream side of the air flow of the defroster opening hole 37a, the face opening hole 37b, and the foot opening hole 37c are respectively arranged a defroster door 38a for regulating an opening area of the defroster opening hole 37a, a face door 38b for regulating an opening area of the face opening hole 37b, and a foot door 38c for regulating an opening area of the foot opening hole 37c, These defroster door 38a, face door 38b, and foot door 38c construct opening hole mode switching parts for switching opening hole modes. These defroster door 38a, face door 38b, and foot door 38c are driven by a servo motor (not shown) whose operation is controlled by the control signal outputted from the air conditioning control unit 40 via a link mechanism or the like.

Further, on the downstream side of the air flow of the defroster opening hole 37a, the face opening hole 37b, and the foot opening hole 37c are respectively connected a defroster air port, a face air port, and a foot air port, which are disposed in the vehicle compartment, via ducts forming respective air passages.

Next, an electric control section of the present embodiment will be described. The air conditioning control unit 40 is constructed of a well-known microcomputer including a CPU, a ROM, and a RAM and its peripheral circuit and performs various operations and processings on the basis of air conditioning control programs stored in the ROM and controls the operations of various kinds of air conditioning devices (compressor 11, high pressure side expansion valve 13, low pressure side opening/closing valve 16b of the low-pressure side pressure reducing device, refrigerant flow passage switching devices 16a, 16c, and blower 32) connected to the output side thereof.

Further, to the input side of the air conditioning control unit 40 are connected a group of various kinds of sensors 41 for air conditioning such as an inside air sensor for detecting temperature inside the vehicle compartment, an outside air sensor for detecting an outside air temperature, a solar radiation sensor for detecting the amount of solar radiation inside the vehicle compartment, an evaporator temperature sensor for detecting the temperature of the air blown off from the inside evaporator 23 (evaporator temperature), a discharge pressure sensor for detecting the pressure of the high pressure refrigerant blown off from the compressor 11, and a suction pressure sensor for detecting the pressure of the refrigerant sucked into the compressor 11.

Further, to the input side of the air conditioning control unit 40 is connected an operation panel (not shown) arranged near the instrument panel at the front of the vehicle compartment, and operation signals from various kinds of air conditioning operation switches disposed in the operation panel are inputted to the air conditioning control unit 40. The various kinds of air conditioning operation switches disposed in the operation panel specifically includes a switch for activating the vehicular air conditioning device 1, a vehicle compartment inside temperature setting switch for setting a vehicle compartment inside temperature, and a selector switch of a cooling operation mode and a heating operation mode.

The air conditioning control unit 40 is a unit in which control parts for controlling the operations of the various kinds of air conditioning control parts connected to the output side of the air conditioning control unit 40 are integrally constructed, and the constructions (hardware and software) for controlling the operations of the respective parts to be controlled construct the control parts for controlling the operations of the respective parts to be controlled.

For example, in the present embodiment, the construction (hardware and software) for controlling the operation of the electric motor of the compressor 11 constructs a discharge capacity control portion and the construction (hardware and software) for controlling the operations of the refrigerant flow passage switching devices 16a to 16c constructs a refrigerant flow passage control part. Of course, the discharge capacity control portion and the refrigerant flow passage control portion may be constructed as separate control devices with respect to the air conditioning control unit 40.

Next, the operations of the vehicular air conditioning device 1 of the present embodiment in the above construction will be described. In the vehicular air conditioning device 1 of the present embodiment, as described above, the operation mode can be switched to the cooling operation mode for cooling the inside of the vehicle compartment, the heating operation mode for heating the inside of the vehicle compartment, and the dehumidifying-heating operation mode for dehumidifying and heating the inside of the vehicle compartment. Operations in the respective operation modes will be described below.

(a) Cooling Operation Mode

The cooling operation mode is started when the cooling operation mode is selected by a selector switch in the state where an operation switch of the operation panel is turned on. In the cooling operation mode, the air conditioning control unit 40 puts the high pressure side expansion valve 13 into the fully open state in which the high pressure side expansion valve 13 does not perform a pressure reducing operation, puts the cooling expansion valve 22 into the throttled state in which the cooling expansion valve 22 performs a pressure reducing operation, and puts the cooling opening/closing valve 16c into the closed state.

Further, the air conditioning control unit 40 puts the low pressure side opening/closing valve 16b into an opened state to thereby bring the low-pressure side pressure reducing device into a fully open state in which the low-pressure side pressure reducing device does not perform a pressure reducing operation, and puts the intermediate pressure side opening/closing valve 16a into a closed state in conjunction with the state of the low pressure side opening/closing valve 16b. In this way, the heat pump cycle 10 is switched to the refrigerant flow passage in which the refrigerant flows in the manner shown by solid arrows in FIG. 1.

In the construction of the refrigerant flow passage, the air conditioning control unit 40 reads the detection signals of the group of sensors 41 for air conditioning and the operation signals of the operation panel. The air conditioning control unit 40 calculates a target air temperature TAO of a target temperature of air to be blown off to the inside of the vehicle compartment on the basis of the values of the detection signals and the operation signals. Further, the air conditioning control unit 40 determines the operation states of the respective air conditioning control parts connected to the output side of the air conditioning control unit 40 on the basis of the calculated target air temperature TAO and the detection signals of the group of sensors 41.

For example, the refrigerant discharge capacity of the compressor 11, that is, a control signal to be outputted to the electric motor of the compressor 11 is determined in the following manner. First, a target evaporator air temperature TEO of the inside evaporator 23 is determined on the basis of the target air temperature TAO with reference to a control map stored previously in the air conditioning control unit 40.

Then, on the basis of a difference between the target evaporator air temperature TEO and the temperature of the air blown off from the inside evaporator 23, which is detected by an evaporator temperature sensor, the control signal to be outputted to the electric motor of the compressor 11 is determined by the use of a feedback technique in such a way that the temperature of the air blown off from the inside evaporator 23 comes closer to the target evaporator air temperature TEO.

Further, the control signal to be outputted to the cooling expansion valve 22 is determined in such a way that the degree of supercooling of the refrigerant flowing into the cooling expansion valve 22 comes closer to a target degree of supercooling, which is predetermined in such a way as to bring the COP closer to a nearly maximum value. Further, the control signal to be outputted to the servo motor of the air mixing door 34 is determined in such a way that the air mixing door 34 closes the air passage of the inside condenser 12 to thereby pass the total flow of the blown air after passing through the inside evaporator 23 through the bypass passage 35.

Then, the control signals determined in the manner described above are outputted to the various kinds of air conditioning control parts. Then, until the operation of the vehicular air conditioning device is required to be stopped by the operation panel, a control routine of: reading the detection signal and the operation signal→calculating the target air temperature TAO→determining the operation state of each of the various kinds of air conditioning control parts→outputting the control voltage and the control signal, is performed at intervals of a predetermined control period. The control routine like this is repeatedly performed in the same way in the other operation modes.

Figure 7:
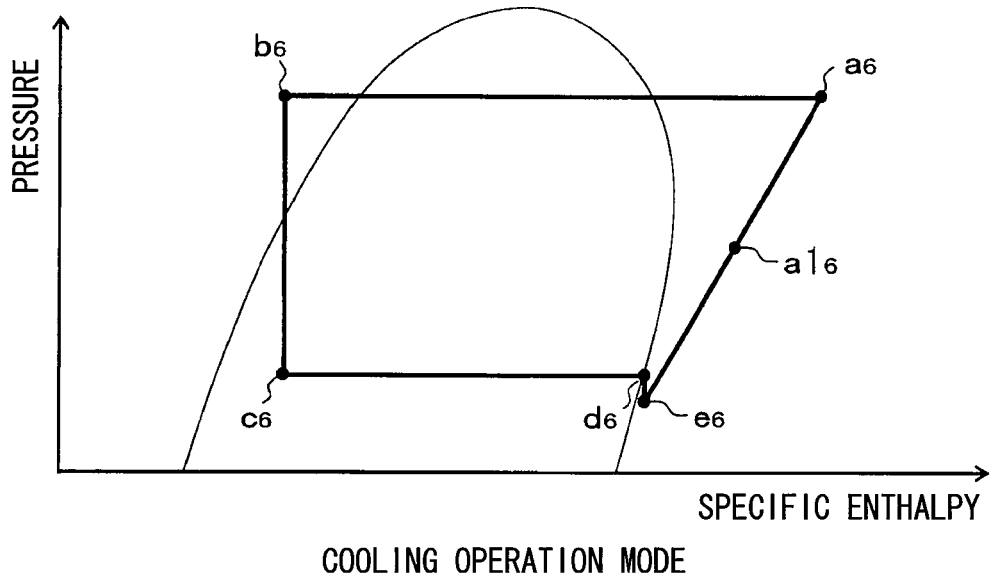
FIG. 7 is a Mollier diagram to show a state of a refrigerant in the cooling operation mode of the heat pump cycle of the first embodiment.

Hence, in the heat pump cycle 10 of the cooling operation mode, as shown by a Mollier diagram in FIG. 7, the high pressure refrigerant (point $a_6$ in FIG. 7) discharged from the discharge port 11c of the compressor 11 flows into the inside condenser 12. At this time, since the air mixing door 34 closes the air passage of the inside condenser 12, the refrigerant flowing into the inside condenser 12 hardly radiates heat to the air to be blown off into the vehicle compartment and flows out of the inside condenser 12.

The refrigerant flowing out of the inside condenser 12 flows through the high pressure side expansion valve 13→the gas-liquid separator 14→the low pressure side opening/closing valve 16b in sequence and then flows into the outside heat exchanger 20. Describing in more detail, since the high pressure side expansion valve 13 is put into the fully open state, the refrigerant flowing out of the inside condenser 12 has pressure hardly reduced by the high pressure side expansion valve 13 and flows out therefrom and flows into the gas-liquid separator 14 from the refrigerant flow-in port 14b of the gas-liquid separator 14.

Here, as described above, the throttling opening of the cooling expansion valve 22 is determined in such a way that the degree of supercooling of the refrigerant flowing into the cooling expansion valve 22 comes closer to the target degree of supercooling, so that the refrigerant flowing into the gas-liquid separator 14 is in a liquid phase state having the degree of supercooling. Hence, the gas and liquid of the refrigerant are not separated from each other in the gas-liquid separator 14 and the liquid-phase refrigerant flows out of the liquid-phase refrigerant flow-out port 14d. Further, since the intermediate pressure side opening/closing valve 16a is in the closed state, the liquid-phase refrigerant does not flow out of the gas-phase refrigerant flow-out port 14c.

Since the low-pressure side pressure reducing device is in the fully open state, the liquid-phase refrigerant flowing out of the liquid-phase refrigerant flow-out port 14d has pressure hardly reduced in the low-pressure side pressure reducing device and flows out therefrom and then flows into the outside heat exchanger 20. In other words, since the low pressure side opening/closing valve 16b is in the opened state in the low-pressure side pressure reducing device, the liquid-phase refrigerant does not flow into the low pressure side fixed throttle 17 side but flows into the outside heat exchanger 20 via the fixed throttle bypassing passage 18. The low pressure refrigerant flowing into the outside heat exchanger 20 exchanges heat with the outside air blown from a blower fan 21, thereby radiating heat to the outside air (point $a_6$→point $b_6$ in FIG. 7).

Since the cooling opening/closing valve 16c is in the closed state, the refrigerant flowing out of the outside heat exchanger 20 flows into the cooling expansion valve 22 set in the throttled state and is reduced in pressure and expanded in an isenthalpic way until the refrigerant becomes the low pressure refrigerant (point $b_6$→point $c_6$ in FIG. 7). Then, the low pressure refrigerant having pressure reduced by the cooling expansion valve 22 flows into the inside evaporator 23 and absorbs heat from the air to be blown into the vehicle compartment blown from the blower 32, thereby being evaporated (point $c_6$→point $d_6$ in FIG. 7). In this way, the air to be blown into the vehicle compartment is cooled.

The refrigerant flowing out of the inside evaporator 23 flows into the accumulator 24 and is separated into gas and liquid. The separated gas-phase refrigerant is sucked from the suction port 11a of the compressor 11 (point $e_6$ in FIG. 7) and then is again compressed in sequence of the low pressure side compression mechanism→the high pressure side compression mechanism (point $e_6$→point $a1_6$→point $a_6$ in FIG. 7). On the other hand, the separated liquid-phase refrigerant is stored as an excess refrigerant in the accumulator 24. Here, the excess refrigerant is the refrigerant that does not require to exert a required refrigeration capacity in the cycle.

The difference of the point $d_6$ from the point $e_6$ in FIG. 7 is caused by a pressure loss in the gas-phase refrigerant flowing in the refrigerant pipe extended from the accumulator 24 to the suction port 11a of the compressor 11 and the amount of heat that the gas-phase refrigerant absorbs from the outside (outside air). Hence, it is desirable that the point $d_6$ is identical to the point $e_6$ in an ideal cycle. This is ditto for the other Mollier diagrams to be described below.

As described above, in the cooling operation mode, the air passage of the inside condenser 12 is closed by the air mixing door 34, so that the blown air cooled by the inside evaporator 23 can be blown off to the inside of the vehicle compartment. In this way, it is possible to cool the inside of the vehicle compartment.

Further, as is clear from the above descriptions, in the cooling operation mode, the refrigerant flowing out of the inside condenser 12 of the first usage side heat exchanger is made to flow through the high pressure side expansion valve 13 put in the fully open state→the gas-liquid separator 14→the low-pressure side pressure reducing device put in the fully open state→the outside heat exchanger 20→the cooling expansion valve 22 of the third pressure reducing portion→the inside evaporator 23 of the second usage side heat exchanger in sequence.

Here, the reason why the intermediate pressure side opening/closing valve 16a is put into the closed state in the cooling operation mode will be described. In the cooling operation mode, as described above, both of the high pressure side expansion valve 13 and the low-pressure side pressure reducing device are put into the fully open state in which the pressure reducing operation is not performed. For this reason, if the gas injection cycle is realized in the state where the intermediate pressure side opening/closing valve 16a is in the opened state, a cycle such that the gas-phase refrigerant discharged from the discharge port 11c of the compressor 11 is made to flow through the inside condenser 12→the intermediate pressure refrigerant passage 15→the intermediate pressure port 11b in sequence and then is again compressed is only repeatedly performed, so that the gas injection cycle does not effectively function in the cooling of the inside of the vehicle compartment but simply uselessly consumes the energy of the compressor 11. In this way, in the present embodiment, in order to reduce the useless consumption of the energy of the compressor 11, the intermediate pressure side opening/closing valve 16a is put into the closed state in the cooling operation mode.

(b) Heating Operation Mode

Next, the heating operation mode will be described. As described above, in the heat pump cycle 10 of the present embodiment, the first heating mode and the second heating mode can be performed as the heating operation mode. First, the heating operation mode is started when the heating operation mode is selected by the selector switch in the state where the activation switch of the vehicular air conditioning device 1 is turned on.

When the heating operation mode is started, the air conditioning control unit 40 reads the detection signal of the group of sensors 41 for the air conditioning control and the operation signal of the operation panel and determines the refrigerant discharge capacity of the compressor 11 (the number of revolutions of the compressor 11). Further, the first heating mode or the second heating mode is performed according to the determined number of revolutions.

(b)-1: First Heating Mode

First, the first heating mode will be described. When the first heating mode is performed, the air conditioning control unit 40 puts the high pressure side expansion valve 13 into the throttled state and puts the cooling expansion valve 22 into the fully closed state and puts the cooling opening/closing valve 16c into the opened state.

Further, the air conditioning control unit 40 puts the low pressure side opening/closing valve 16b into the closed state to thereby bring the low-pressure side pressure reducing device into the throttled state in which the low-pressure side pressure reducing device performs the pressure reducing operation, and then puts the intermediate pressure side opening/closing valve 16a into the opened state in conjunction with the state of the low pressure side opening/closing valve 16b. In this way, the heat pump cycle 10 is switched to the refrigerant flow passage in which the refrigerant flows in the manner shown by the solid arrows in FIG. 2.

In this refrigerant flow passage construction (cycle construction), as is the case with the cooling operation mode, the air conditioning control unit 40 reads the detection signal of the group of sensors 41 for the air conditioning control and the operation signal of the operation panel and determines the operation states of the various kinds of air conditioning control parts connected to the output side of the air conditioning control unit 40 based on the target air temperature TAO and the detection signal of the group of sensors.

In the first heating mode, the control signal to be outputted to the high pressure side expansion valve 13 is determined in such a way that the throttle opening of the high pressure side expansion valve 13 becomes a given opening predetermined for the first heating mode. Further, the control signal to be outputted to the servo motor of the air mixing door 34 is determined in such a way that the air mixing door 34 closes the bypass passage 35 to thereby pass the total flow of the blown air after passing through the inside evaporator 23 through the inside condenser 12.

Figure 8:
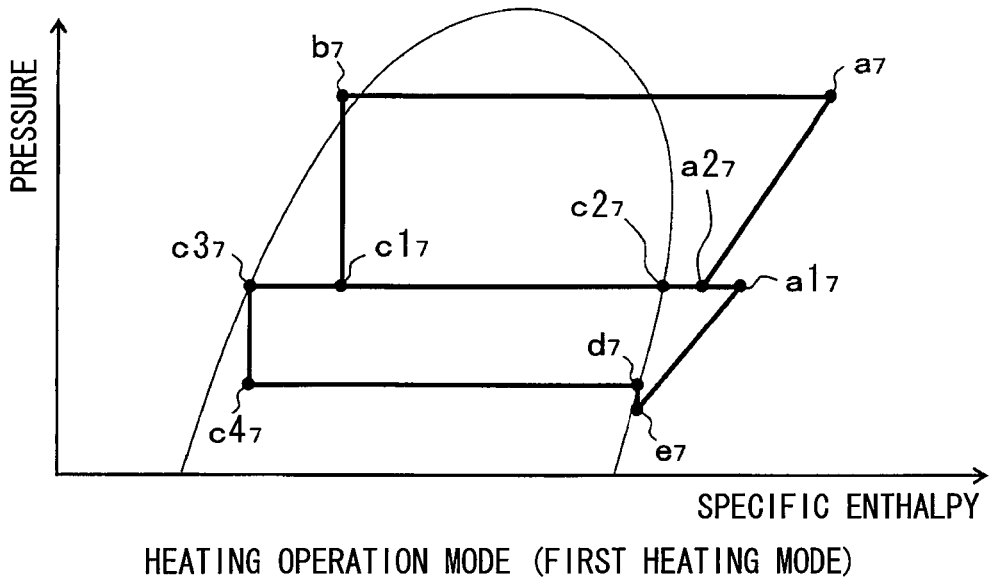
FIG. 8 is a Mollier diagram to show a state of the refrigerant in the first heating mode of the heat pump cycle of the first embodiment.

Hence, in the heat pump cycle 10 of the first heating mode, as shown by a Mollier diagram in FIG. 8, the high pressure refrigerant (point $a_7$ in FIG. 8) discharged from the discharge port 11c of the compressor 11 flows into the inside condenser 12. The refrigerant flowing into the inside condenser 12 exchanges heat with the air to be blown into the vehicle compartment, which is blown from the blower 32 and is passed through the inside evaporator 23, thereby radiating heat (point $a_7$→point $b_7$ in FIG. 8). In this way, the air to be blown into the vehicle compartment is heated.

The refrigerant flowing out of the inside condenser 12 is reduced in pressure and expanded in the isenthalpic way by the high pressure side expansion valve 13 put in the throttled state until the refrigerant becomes the intermediate pressure refrigerant (point $b_7$→point $c1_7$ in FIG. 7). The intermediate pressure refrigerant having pressure reduced by the high pressure side expansion valve 13 is separated into gas and liquid by the gas-liquid separator 14 (point $c_7$→point $c2_7$, point $c_7$→point $c3_7$ in FIG. 8).

Since the intermediate pressure opening/closing valve 16a is in the opened state, the gas-phase refrigerant separated by the gas-liquid separator 14 flows into the intermediate pressure port 11b of the compressor 11 via the intermediate pressure refrigerant passage 15 (point $c2_7$→point $a2_7$ in FIG. 8) and mixes with the refrigerant discharged from the low pressure side compression mechanism (point $a1_7$ in FIG. 8) and then is sucked by the high pressure side compression mechanism.

On the other hand, since the low-pressure side pressure reducing device is put in the throttled state, the liquid-phase refrigerant separated by the gas-liquid separator 14 has pressure reduced by the low-pressure side pressure reducing device until the refrigerant becomes the low pressure refrigerant, and then flows into the outside heat exchanger 20. In other words, in the low-pressure side pressure reducing device, since the low pressure side opening/closing valve 16b is in the closed state, the liquid-phase refrigerant flows into the low pressure side fixed throttle 17 and is reduced in pressure and expanded in the isenthalpic way until the refrigerant becomes the low pressure refrigerant (point $c3_7$→point $c4_7$ in FIG. 8). The refrigerant flowing out of the low pressure side fixed throttle 17 flows into the outside heat exchanger 20 and exchanges heat with the outside air blown from the blower fan 21, thereby absorbing heat (point $c4_7$→point $d_7$ in FIG. 8).

Since the cooling opening/closing valve 16c is in the opened state, the refrigerant flowing out of the outside heat exchanger 20 flows into the accumulator 24 via the expansion valve bypassing passage 25 and is separated into gas and liquid. The separated gas-phase refrigerant is sucked from the suction port 11a (point $e_7$ in FIG. 8) of the compressor 11 and is again compressed. On the other hand, the separated liquid-phase refrigerant is stored as the excess refrigerant in the accumulator 24, the excess refrigerant being the refrigerant that the cycle does not require so as to exert the required refrigeration capacity.

As described above, in the first heating mode, the heat held by the refrigerant discharged from the compressor 11 can be radiated to the air to be blown into the vehicle compartment in the inside condenser 12 and the air to be blown into the vehicle compartment, which is heated, can be blown off to the inside of the vehicle compartment. In this way, the inside of the vehicle compartment can be heated.

Still further, in the first heating mode can be constructed the gas injection cycle (economized refrigeration cycle) in which the low pressure refrigerant having pressure reduced by the low pressure side fixed throttle 17 is sucked from the suction port 11a of the compressor 11 and in which the intermediate pressure refrigerant having pressure reduced by the high pressure side expansion valve 13 is made to flow into the intermediate pressure port 11b, thereby being mixed with the low pressure refrigerant in a pressure boosting process.

Hence, by making the high pressure side compression mechanism suck the mixed refrigerant of low temperature, the compression efficiency of the high pressure side compression mechanism can be improved and a pressure difference between the pressure of the sucked refrigerant and the pressure of the discharged refrigerant in both of the low pressure side compression mechanism and the high pressure side compression mechanism can be decreased, whereby the compression efficiency in both of the compression mechanisms can be improved. As a result, the COP of the heat pump cycle 10 as a whole can be improved.

Further, as will be clear from the above description, in the first heating mode, the refrigerant flowing out of the inside condenser 12 of the first usage side heat exchanger is made to flow through the high pressure side expansion valve 13 put in the throttled state→the gas-liquid separator 14→the low-pressure side pressure reducing device put in the throttled state→the outside heat exchanger 20→the accumulator 24 in sequence, and the gas-phase refrigerant separated by the gas-liquid separator 14 is made to flow through the intermediate pressure refrigerant passage 15→the intermediate pressure port 11b of the compressor 11 in sequence.

(b)-2: Second Heating Mode

Next, the second heating mode will be described. When the second heating mode is performed, the air conditioning control unit 40 puts the high pressure side expansion valve 13 into the throttled state in which the high pressure side expansion valve 13 performs the pressure reducing operation and puts the cooling expansion valve 22 into the fully closed state and puts the cooling opening/closing valve 16c into the opened state.

Further, the air conditioning control unit 40 puts the low pressure side opening/closing valve 16b into the opened state to thereby bring the low-pressure side pressure reducing device into the fully open state in which the low-pressure side pressure reducing device does not perform the pressure reducing operation, and puts the intermediate pressure side opening/closing valve 16a into the closed state in conjunction with the state of the low pressure side opening/closing valve 16b. The heat pump cycle 10 is switched to the refrigerant flow passage in which the refrigerant flows in the manner shown by solid arrows in FIG. 3.

In this refrigerant flow passage construction (cycle construction), as is the case with the cooling operation mode, the air conditioning control unit 40 reads the detection signal of the group of sensors 41 for the air conditioning control and the operation signal of the operation panel and determines the operation state of the various kinds of air conditioning control parts connected to the output side of the air conditioning control unit 40 on the basis of the target air temperature TAO and the detection signal of the group of sensors 41.

In the second heating mode, a control signal to be outputted to the high pressure side expansion valve 13 is determined in such a way that the throttle opening of the high pressure side expansion valve 13 becomes a given opening predetermined for the second heating mode. Further, a control signal to be outputted to the servo motor of the air mixing door 34 is determined in such a way that the air mixing door 34 closes the bypass passage 35 to thereby pass the total flow of the blown air after passing through the inside evaporator 23 through the inside condenser 12.

Figure 9:
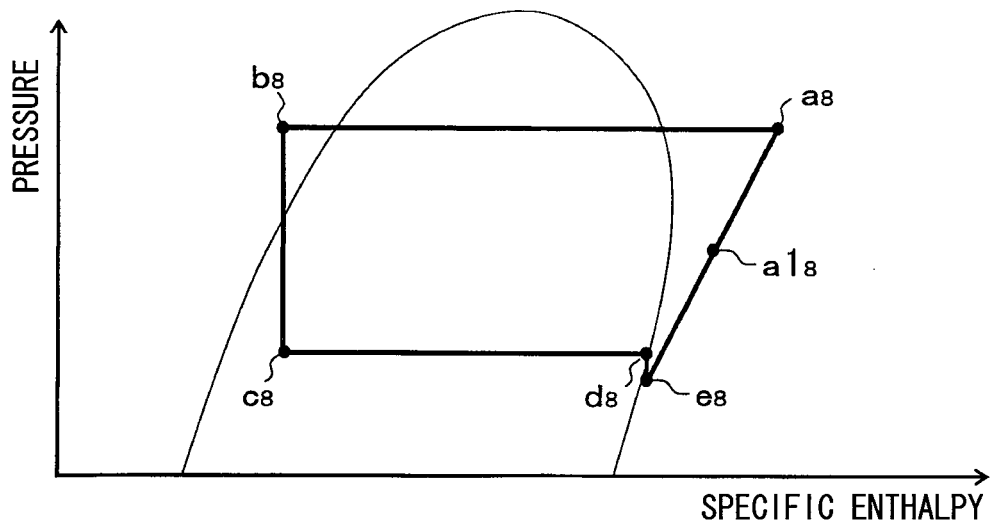
FIG. 9 is a Mollier diagram to show a state of the refrigerant in the second heating mode of the heat pump cycle of the first embodiment.

Hence, in the heat pump cycle 10 in the second heating mode, as shown by a Mollier diagram in FIG. 9, the high pressure refrigerant (point $a_8$ in FIG. 9) discharged from the discharge port 11c of the compressor 11 flows into the inside condenser 12 and exchanges heat with the air to be blown into the vehicle compartment, thereby radiating heat (point $a_8$→point $b_8$ in FIG. 9), as is the case with the second heating mode. In this way, the air to be blown into the vehicle compartment is heated.

The refrigerant flowing out of the inside condenser 12 is reduced in pressure and expanded in the isenthalpic way by the high pressure side expansion valve 13 put in the throttled state until the refrigerant becomes the low pressure refrigerant (point $b_8$→point $c_8$ in FIG. 9) and then flows into the gas-liquid separator 14. At this time, since the intermediate pressure side opening/closing valve 16a is in the closed state, the refrigerant flowing into the gas-liquid separator 14 is not separated into gas and liquid but flows out of the liquid-phase refrigerant flow-out port 14d.

On the other hand, since the low-pressure side pressure reducing device is in the fully open state, the liquid-phase refrigerant separated by the gas-liquid separator 14 has pressure hardly reduced by the low-pressure side pressure reducing device and flows out therefrom and then flows into the outside heat exchanger 20. In other words, since the low pressure side opening/closing valve 16b is in the opened state, in the low-pressure side pressure reducing device, the liquid-phase refrigerant does not flow into the low pressure side fixed throttle 17 but flows into the outside heat exchanger 20 via the fixed throttle bypassing passage 18. The low pressure refrigerant flowing into the outside heat exchanger 20 exchanges heat with the outside air blown from the blower fan 21, thereby absorbing heat (point $c_8$→point $d_8$ in FIG. 9). The subsequent operations are the same as in the first heating mode.

As described above, in the second heating mode, the heat held by the refrigerant discharged from the compressor 11 can be radiated to the air to be blown into the vehicle compartment in the inside condenser 12 and hence the air to be blown into the vehicle compartment, which has been heated, can be blown off to the inside of the vehicle compartment. In this way, the inside of the vehicle compartment can be heated.

Here, an effect produced by performing the second heating mode in place of the first heating mode in the case where a heating load is comparatively low, for example, in the case where the outside temperature is high will be described. In the first heating mode, as described above, the gas injection cycle can be constructed, so that the COP of the heat pump cycle 10 as a whole can be improved.

In other words, theoretically, if the number of revolutions of the compressor 11 is the same, higher heating performance can be produced in the first heating mode than in the second heating mode. In other words, the number of revolutions of the compressor 11 (refrigerant discharge capacity) required to produce the same heating performance becomes lower in the second heating mode than in the first heating mode.

However, the compression mechanism has a maximum efficiency number of revolutions in which a compression efficiency becomes maximum (peak) and has a characteristic such that when the number of revolutions becomes lower than the maximum efficiency number of revolutions, the compression efficiency becomes greatly lower. For this reason, in the case where the heating load is comparatively low, when the compressor 11 is operated at a number of revolutions lower than the maximum efficiency number of revolutions, in the first heating mode, conversely, the COP is decreased in some cases.

Hence, in the present embodiment, assuming that the maximum efficiency number of revolutions is a base number of revolutions, in the case where the number of revolutions of the compressor 11 becomes lower than the base number of revolutions during the performance of the first heating mode, the first heating mode is switched to the second heating mode, whereas in the case where the number of revolutions becomes higher than a number of revolutions acquired by adding a predetermined amount to the base number of revolutions during the performance of the second heating mode, the second heating mode is switched to the first heating mode.

In this way, of the first heating mode and the second heating mode, an operation mode capable of achieving a higher COP is selected. Hence, even in the case where the number of revolutions of the compressor 11 becomes lower than the base number of revolutions during the performance of the first heating mode, by switching the first heating mode to the second heating mode, the COP of the heat pump cycle 10 as a whole can be improved.

(c) Dehumidifying-Heating Operation Mode

Next, the dehumidifying-heating operation mode will be described. The dehumidifying-heating operation mode is performed when a set temperature set by the vehicle compartment temperature setting switch is higher than the outside air temperature in the cooling operation mode.

When the dehumidifying-heating operation mode is performed, the air conditioning control unit 40 puts the high pressure side expansion valve 13 into the fully open state or the throttled state and puts the cooling expansion valve 22 into the fully open state or the throttled state and puts the cooling opening/closing valve16c into the closed state.

Further, the air conditioning control unit 40 puts the low pressure side opening/closing valve 16b into the opened state to thereby bring the low-pressure side pressure reducing device into the fully open state in which the low-pressure side pressure reducing device does not perform the pressure reducing operation, and puts the intermediate pressure side opening/closing valve 16a into the closed state in conjunction with the state of the low pressure side opening/closing valve 16b. In this way, the heat pump cycle 10 is switched to the refrigerant passage in which the refrigerant flows as shown by solid arrows in FIG. 1 as is the case with the cooling operation mode.

Hence, the refrigerant passage in the dehumidifying-heating operation mode, as is the case with the cooling operation mode, corresponds to the refrigerant passage in a first operation mode claimed in the claims. Further, the control signal to be outputted to the servo motor of the air mixing door 34 is determined in such a way that the air mixing door 34 closes the bypass passage 35 to thereby pass the total flow of the blown air after passing through the inside evaporator 23 through the inside condenser 12.

Further, in the dehumidifying-heating operation mode of the present embodiment, the throttle opening of the high pressure side expansion valve 13 and the throttle opening of the cooling expansion valve 22 are changed according to a temperature difference between the set temperature and the outside air temperature. Specifically, as the target air temperature TAO is increased, the throttle opening of the high pressure side expansion valve 13 is decreased and the throttle opening of the cooling expansion valve 22 is increased, whereby the following four steps of the dehumidifying-heating operation mode from a first dehumidifying-heating mode to a fourth dehumidifying-heating mode are performed.

(c)-1: First Dehumidifying-Heating Mode

In the first dehumidifying-heating mode, the air conditioning control unit 40 puts the high pressure side expansion valve 13 into the fully open state and puts the cooling expansion valve 22 into the throttled state. Hence, although the cycle construction (refrigerant flow passage) is exactly the same as in the cooling operation mode, the air mixing door 34 fully opens the air passage of the inside condenser 12, so that the state of the refrigerant circulated in the cycle is changed as shown by a Mollier diagram in FIG. 10.

Figure 10:
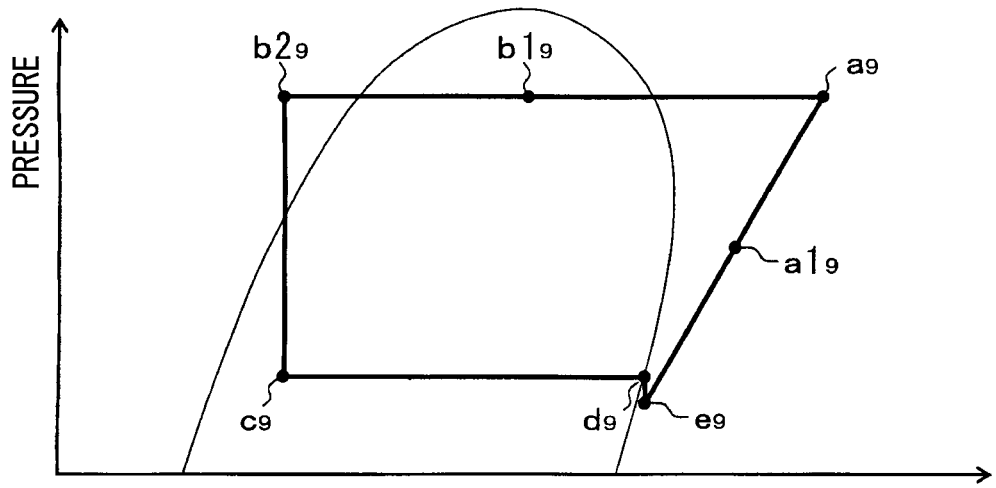
FIG. 10 is a Mollier diagram to show a state of the refrigerant in a first dehumidifying-heating mode of the heat pump cycle of the first embodiment.

That is, as shown in FIG. 10, the high pressure refrigerant flowing out of the discharge port 11c of the compressor 11 (point $a_9$ in FIG. 10) flows into the inside condenser 12 and exchanges heat with the air to be blown into the vehicle compartment, which is cooled and dehumidified in the inside evaporator 23, thereby radiating heat (point $a_9 \rightarrow$ point $b1_9$ in FIG. 10). In this way, the air to be blown into the vehicle compartment is heated.

The refrigerant flowing out of the inside condenser 12, as is the case with the cooling operation mode, flows through the high pressure side expansion valve 13→the gas-liquid separator 14→the low pressure side opening/closing valve 16b of the low-pressure side pressure reducing device in sequence and then flows into the outside heat exchanger 20. The low pressure refrigerant flowing into the outside heat exchanger 20 exchanges heat with the outside air blown from the blower fan 21, thereby radiating heat (point $b1_9 \rightarrow$ point $b2_9$ in FIG. 10). The subsequent operations are the same as in the cooling operation mode.

As described above, in the first dehumidifying-heating mode, the air to be blown into the vehicle compartment, which is cooled and dehumidified by the inside evaporator 23, can be heated by the inside condenser 12 and can be blown into the vehicle compartment. In this way, the inside of the vehicle compartment can be dehumidified and heated.

(c)-2: Second Dehumidifying-Heating Mode

Next, when the target air temperature TAO becomes higher than a predetermined first base temperature during the performance of the first dehumidifying-heating mode, the second dehumidifying-heating mode is performed. In the second dehumidifying-heating mode, the air conditioning control unit 40 puts the high pressure side expansion valve 13 into the throttled state and puts the throttle opening of the cooling expansion valve 22 into a throttled state in which the throttle opening is larger than in the first dehumidifying-heating mode. Hence, in the second dehumidifying-heating mode, the state of the refrigerant circulated in the cycle is changed as shown by a Mollier diagram in FIG. 11.

Figure 11:
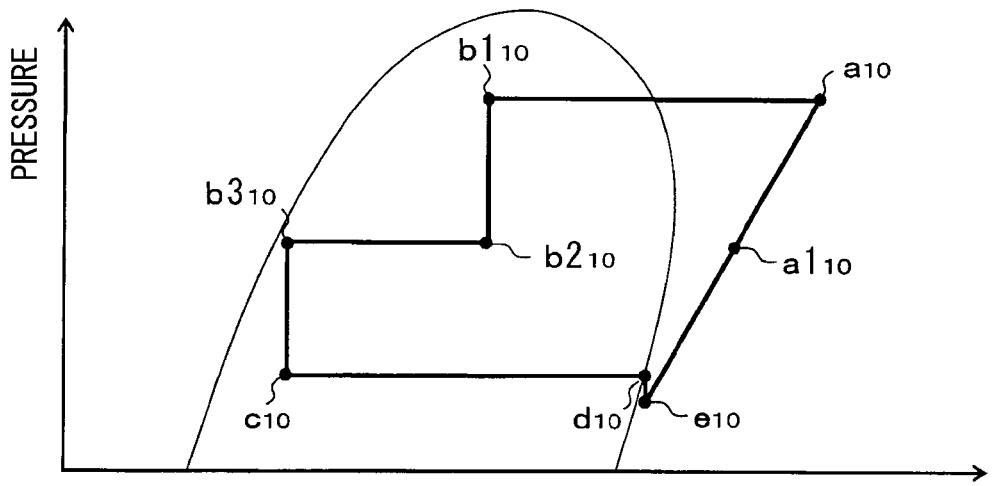
FIG. 11 is a Mollier diagram to show a state of the refrigerant in a second dehumidifying-heating mode of the heat pump cycle of the first embodiment.

That is, as shown in FIG. 11, the high pressure refrigerant flowing out of the discharge port 11c of the compressor 11 (point $a_{10}$ in FIG. 11), as is the case with the first dehumidifying-heating mode, flows into the inside condenser 12 and exchanges heat with the air to be blown into the vehicle compartment, which has been cooled and dehumidified in the inside evaporator 23, thereby radiating heat (point $a_{10} \rightarrow$ point $b1_{10}$ in FIG. 11). In this way, the air to be blown into the vehicle compartment is heated.

The refrigerant flowing out of the inside condenser 12 has pressure reduced in the isenthalpic way by the high pressure side expansion valve 13 put in the throttled state until the refrigerant becomes the intermediate pressure refrigerant (point $b1_{10}$→point $b2_{10}$ in FIG. 11). The intermediate pressure refrigerant having pressure reduced by the high pressure side expansion valve 13 flows through the gas-liquid separator 14→the low pressure side opening/closing valve 16b of the low-pressure side pressure reducing device in sequence and then flows into the outside heat exchanger 20.

Then, the low pressure refrigerant flowing into the outside heat exchanger 20 exchanges heat with the outside air blown from the blower fan 21, thereby radiating heat (point $b2_{10}$→point $b3_{10}$ in FIG. 11). The subsequent operations are the same as in the cooling operation mode.

As described above, in the second dehumidifying-heating mode, as is the case with the first dehumidifying-heating mode, the air to be blown into the vehicle compartment, which has been cooled and dehumidified by the inside evaporator 23, can be heated by the inside condenser 12 and can be blown to the inside of the vehicle compartment. In this way, the inside of the vehicle compartment can be dehumidified and heated.

At this time, in the second dehumidifying-heating mode, the high pressure side expansion valve 13 is put into the throttled state, so that the temperature of the refrigerant flowing into the outside heat exchanger 20 can be made lower than in the first second dehumidifying-heating mode. Hence, a temperature difference between the temperature of the refrigerant in the outside heat exchanger 20 and the outside air temperature can be decreased and hence the amount of heat radiated from the refrigerant in the outside heat exchanger 20 can be decreased.

As a result, the amount of refrigerant in the inside condenser 12 can be increased and hence the temperature blown off from the inside condenser 12 can be made higher than in the first dehumidifying-heating mode.

(c)-3: Third Dehumidifying-Heating Mode

Next, when the target air temperature TAO becomes higher than a predetermined second base temperature during the performance of the second dehumidifying-heating mode, the third dehumidifying-heating mode is performed. In the third dehumidifying-heating mode, the air conditioning control unit 40 puts the throttle opening of the high pressure side expansion valve 13 into a throttled state in which the throttle opening is smaller than in the second dehumidifying-heating mode and makes the throttle opening of the cooling expansion valve 22 larger than in the second dehumidifying-heating mode. Hence, in the third dehumidifying-heating mode, the state of the refrigerant circulated in the cycle is changed as shown by a Mollier diagram in FIG. 12.

Figure 12:
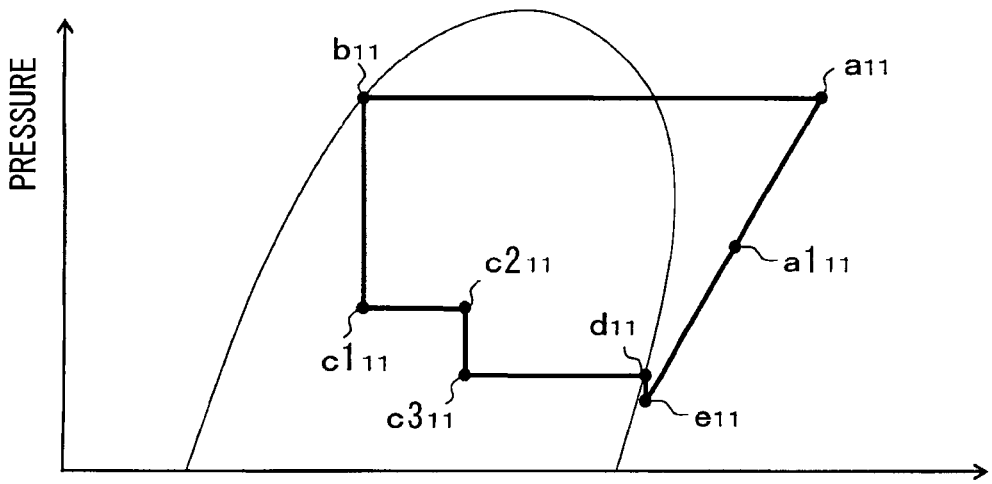
FIG. 12 is a Mollier diagram to show a state of the refrigerant in a third dehumidifying-heating mode of the heat pump cycle of the first embodiment.

That is, as shown in FIG. 12, the high pressure refrigerant flowing out of the discharge port 11c of the compressor 11 (point $a_{11}$ in FIG. 12), as is the case with the first and the second dehumidifying-heating modes, flows into the inside condenser 12 and exchanges heat with the air to be blown into the vehicle compartment, which has been cooled and dehumidified in the inside evaporator 23, thereby radiating heat (point $a_{11}$→point $b_{11}$ in FIG. 12). In this way, the air to be blown into the vehicle compartment is heated.

The refrigerant flowing out of the inside condenser 12 has pressure reduced in the isenthalpic way by the high pressure side expansion valve 13 put in the throttled state until the refrigerant becomes the intermediate pressure refrigerant lower in temperature than the outside air temperature (point $b_{11}$→point $c1_{11}$ in FIG. 12). The intermediate pressure refrigerant having pressure reduced by the high pressure side expansion valve 13 flows through the gas-liquid separator 14→the low pressure side opening/closing valve 16b of the low-pressure side pressure reducing device in sequence and then flows into the outside heat exchanger 20.

Then, the low pressure refrigerant flowing into the outside heat exchanger 20 exchanges heat with the outside air blown from the blower fan 21, thereby radiating heat (point $c1_{11}$→point $c2_{11}$ in FIG. 12). Further, the refrigerant flowing out of the outside heat exchanger 20 has pressure reduced in the isenthalpic way by the cooling expansion valve 22 (point $c2_{11}$→point $c3_{11}$ in FIG. 12) and then flows into the inside evaporator 23. The subsequent operations are the same as in the cooling operation mode.

As described above, in the third dehumidifying-heating mode, as is the case with the first and the second dehumidifying-heating modes, the air to be blown into the vehicle compartment, which has been cooled and dehumidified by the inside evaporator 23, can be heated by the inside condenser 12 and can be blown to the inside of the vehicle compartment. In this way, the inside of the vehicle compartment can be dehumidified and heated.

At this time, in the third dehumidifying-heating mode, the outside heat exchanger 20 is operated as an evaporator by decreasing the throttle opening of the high pressure side expansion valve 13, so that the amount of refrigerant in the inside condenser 12 can be made larger than in the second dehumidifying-heating mode. As a result, the temperature blown off from the inside condenser 12 can be made higher than in the second dehumidifying-heating mode.

(c)-4: Fourth Dehumidifying-Heating Mode

Next, when the target air temperature TAO becomes higher than a predetermined third base temperature during the performance of the third dehumidifying-heating mode, the fourth dehumidifying-heating mode is performed. In the fourth dehumidifying-heating mode, the air conditioning control unit 40 puts the throttle opening of the high pressure side expansion valve 13 into the throttled state in which the throttle opening is smaller than in the third dehumidifying-heating mode and puts the cooling expansion valve 22 into the fully open state. Hence, in the fourth dehumidifying-heating mode, the state of the refrigerant circulated in the cycle is changed as shown by a Mollier diagram in FIG. 13.

Figure 13:
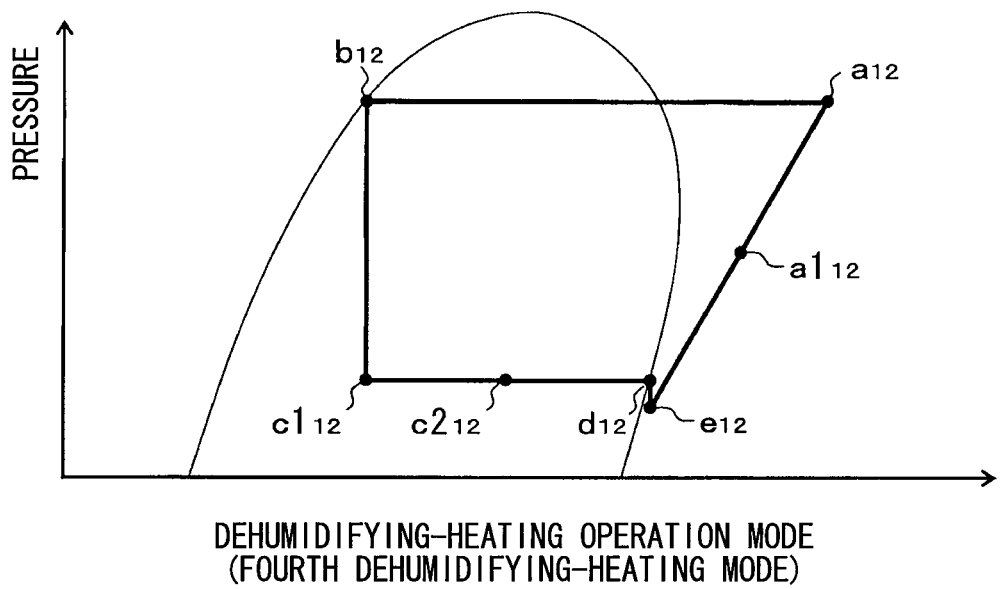
FIG. 13 is a Mollier diagram to show a state of the refrigerant in a fourth dehumidifying-heating mode of the heat pump cycle of the first embodiment.

That is, as shown in FIG. 13, the high pressure refrigerant discharged from the discharge port 11c of the compressor 11 (point $a_{12}$ in FIG. 13), as is the case with the first and the second dehumidifying-heating modes, flows into the inside condenser 12 and exchanges heat with the air to be blown into the vehicle compartment, which has been cooled and dehumidified in the inside evaporator 23, thereby radiating heat (point $a_{12}$→point $b_{12}$ in FIG. 13). In this way, the air to be blown into the vehicle compartment is heated.

The refrigerant flowing out of the inside condenser 12 has pressure reduced in the isenthalpic way by the high pressure side expansion valve 13 put in the throttled state until the refrigerant becomes the low pressure refrigerant lower in temperature than the outside air temperature (point $b_{12}$→point $c1_{12}$ in FIG. 13). The intermediate pressure refrigerant having pressure reduced by the high pressure side expansion valve 13 flows through the gas-liquid separator 14→the low pressure side opening/closing valve 16b of the low-pressure side pressure reducing device in sequence and then flows into the outside heat exchanger 20.

Then, the low pressure refrigerant flowing into the outside heat exchanger 20 exchanges heat with the outside air blown from the blower fan 21, thereby absorbing heat (point $c1_{12}$→point $c2_{12}$ in FIG. 13). Further, since the cooling expansion valve 22 is in the fully open state, the refrigerant flowing out of the outside heat exchanger 20 does not have pressure reduced and flows into the inside evaporator 23. The subsequent operations are the same as in the cooling operation mode.

As described above, in the fourth dehumidifying-heating mode, as is the case with the first to the third dehumidifying-heating modes, the air to be blown into the vehicle compartment, which has been cooled and dehumidified by the inside evaporator 23, can be heated by the inside condenser 12 and can be blown off to the inside of the vehicle compartment. In this way, the inside of the vehicle compartment can be dehumidified and heated.

At this time, in the fourth dehumidifying-heating mode, as is the case with the third dehumidifying-heating mode, the outside heat exchanger 20 is operated as the evaporator and the throttle opening of the high pressure side expansion valve 13 is made smaller than in the third dehumidifying-heating mode, so that an refrigerant evaporation temperature in the outside heat exchanger 20 can be made lower. Hence, a temperature difference between the temperature of the refrigerant in the outside heat exchanger 20 and the outside air temperature can be made larger than in the third dehumidifying-heating mode and hence the amount of refrigerant in the inside condenser 12 can be increased.

As a result, the temperature blown off from the inside condenser 12 can be made higher than in the third dehumidifying-heating mode.

Here, the reason why the intermediate pressure opening/closing valve 16a is put into the closed state in the dehumidifying-heating operation mode will be described. In the case where the gas injection cycle is realized in the dehumidifying-heating operation mode, the flow rate of the refrigerant flowing through the intermediate pressure passage 15 is changed by a pressure difference between a refrigerant pressure in the gas-liquid separator 14 and a refrigerant pressure in the intermediate pressure port 11b of the compressor 11. The amount of heat radiation of the refrigerant in the inside condenser 12 is changed by a change in the flow rate of the refrigerant flowing through the intermediate pressure passage 15, which makes it difficult to regulate the temperature of the blown air. Hence, in order to appropriately regulate the temperature of the blown air, the cycle construction and various kinds of controls are complicated.

In particular, as is the case with the dehumidifying-heating operation mode of the present embodiment, in the case where the throttle opening of the high pressure side expansion valve 13 and the throttle opening of the cooling expansion valve 22 are changed according to the target air temperature TAO, when the gas injection cycle is realized in the state where the intermediate pressure opening/closing valve 16a is put in the opened state, the target air temperature TAO and the flow rate of the refrigerant flowing through the intermediate pressure refrigerant passage 15 are in the opposite relationship, which makes it difficult to regulate the temperature of the blown air.

For example, of the first to the fourth dehumidifying-heating modes, in the first dehumidifying-heating mode performed when the target air temperature TAO is lowest, the high pressure side expansion valve 13 is put into the fully open state, whereby the pressure difference between the refrigerant pressure in the gas-liquid separator 14 and the refrigerant pressure at the intermediate pressure port 11b of the compressor 11 becomes maximum. As a result, the flow rate of the refrigerant flowing through the intermediate pressure refrigerant passage 15 is increased and hence the amount of heat radiation in the inside condenser 12 is increased, which makes it difficult to decrease the temperature of the blown-off air.

Further, of the first to the fourth dehumidifying-heating modes, in the fourth dehumidifying-heating mode performed when the target air temperature TAO is high, the high pressure side expansion valve 13 is put into the throttled state, whereby the pressure difference between the refrigerant pressure in the gas-liquid separator 14 and the refrigerant pressure at the intermediate pressure port 11b of the compressor 11 becomes minimum. As a result, the flow rate of the refrigerant flowing through the intermediate pressure refrigerant passage 15 is decreased and hence the amount of heat radiation in the inside condenser 12 is decreased, which makes it difficult to increase the temperature of the blown-off air.

In this way, in the present embodiment, in order to prevent the cycle construction and the control at the time of regulating the temperature of the blown air from being complicated, the intermediate pressure side opening/closing valve 16a is put into the closed state in the dehumidifying-heating operation mode.

Further, the reason why the low-pressure side pressure reducing device is put into the fully open state in which the low-pressure side pressure reducing device does not perform the pressure reducing operation in the dehumidifying-heating operation mode is as follows: in the case where the low-pressure side pressure reducing device is put into the throttled state, the regulation ranges of the amount of heat absorption and the amount of heat radiation in the outside heat exchanger 20 are limited, which makes it difficult to finely regulate the temperature of the blown air.

In this way, in the dehumidifying-heating operation mode of the present embodiment, the intermediate pressure side opening/closing valve 16a is put into the closed state and further the low-pressure side pressure reducing device is put into the fully open state in which the low-pressure side pressure reducing device does not perform the pressure reducing operation, which hence prevents the cycle construction and the control at the time of regulating the temperature of the blown air from being complicated and realizes a fine temperature regulation of the blown air.

In the above-mentioned vehicular air conditioning device 1 of the present embodiment, both of the high pressure side expansion valve 13 of constructing the first pressure reducing portion and the low-pressure side pressure reducing device of constructing the second pressure reducing portion can be set in the fully open state in which the pressure reducing operation is not performed. For this reason, not by arranging the refrigerant passage extended from the compressor 11 to the outside heat exchanger 20 as respective separate refrigerant passages according to the respective operation modes of the vehicular air conditioning device 1 but by changing the states (throttled state, fully open state) of the high pressure side expansion valve 13 and the low-pressure side pressure reducing device, the amount of heat exchange between the refrigerant and the outside air in the outside heat exchanger 20 (the amount of heat absorption and the amount of heat radiation) can be regulated according to the respective operation modes.

Hence, in the heat pump cycle of constructing the gas injection cycle, cooling, heating, and dehumidifying-heating operations can be realized by a simple cycle construction.

Further, the present embodiment is provided with the intermediate pressure side opening/closing valve 16a for opening/closing the intermediate pressure refrigerant passage 15, so that the heat pump cycle can be switched between the gas injection cycle and a normal cycle (one-step compression cycle) by opening and closing the intermediate pressure refrigerant passage 15 by the use of the intermediate pressure side opening/closing valve 16a.

Still further, the present embodiment employs the construction in which the heat pump cycle 10 is switched to the normal cycle by closing the intermediate pressure refrigerant passage 15 by the use of the intermediate pressure side opening/closing valve 16a in the cooling operation mode and in the dehumidifying-heating operation mode.

In this way, when the construction is employed in which the heat pump cycle 10 is switched to the normal cycle by closing the intermediate pressure refrigerant passage 15 in the cooling operation mode, the useless energy consumption of the compressor 11 can be reduced.

Still further, when the construction is employed in which the heat pump cycle 10 is switched to the normal cycle by closing the intermediate pressure refrigerant passage 15 in the dehumidifying-heating operation mode, the amount of heat radiation of the refrigerant in the inside condenser 12 can be easily regulated and hence an appropriate temperature regulation of the blown air can be realized by the simple construction.

In particular, the present embodiment employs the construction in which the throttle opening of the high pressure side expansion valve 13 and the throttle opening of the cooling expansion valve 22 are changed according to the target air temperature TAO in the dehumidifying-heating operation mode, so that the amount of heat radiation of the refrigerant in the inside condenser 12 and the amount of heat absorption of the refrigerant in the inside evaporator 23 can be appropriately regulated and hence a fine temperature regulation of the blown air can be realized by the simple construction.

Further, in the heating operation mode, the heat pump cycle 10 is switched to the gas injection cycle by opening the intermediate pressure refrigerant passage 15 by the use of the intermediate pressure side opening/closing valve 16a, so that the coefficient of performance (COP) of the cycle can be improved.

Still further, in the vehicular air conditioning device 1 applied to the electric vehicle like the present embodiment, the waste heat of the engine cannot be used for heating the inside of the vehicle compartment like a vehicle mounted with an internal combustion engine. Hence, it is extremely effective to achieve a high COP without using the heating load in heating operation mode like the heat pump cycle 10 of the present embodiment.

Still further, in the heat pump cycle 10 of the present embodiment, the gas-liquid separator 14 of a centrifugal separation type is employed as the gas-liquid separation portion and the inside volume of the gas-liquid separator 14 is made smaller than the volume of the excess refrigerant, so that the size of the gas-liquid separation portion can be reduced and hence the ease of mounting the heat pump cycle 10 as a whole in the vehicle can be improved. Moreover, even if a load variation is caused in the cycle, the refrigerant that becomes excess can be stored in the accumulator 24 and hence the cycle can be stably operated.

Still further, in the heat pump cycle 10 of the present embodiment, the fixed throttle having the flow characteristic shown in FIG. 6(a) is employed as the low pressure side fixed throttle 17 of the low-pressure side pressure reducing device (second pressure reducing part), so that in the heating operation mode, the refrigerant whose quality fraction dryness X is 0.1 or less can be made to flow into the outside heat exchanger 20 and hence can surely perform the heat absorbing operation.

The centrifugal separation type gas-liquid separator 14 employed by the heat pump cycle 10 of the present embodiment is increased in gas-liquid separation performance as the flow velocity of the refrigerant is increased, so that the gas-liquid separator 14 can be effectively applied to the heat pump cycle 10 operated at a comparatively low load with a high frequency.

(Second Embodiment)

Figure 14:
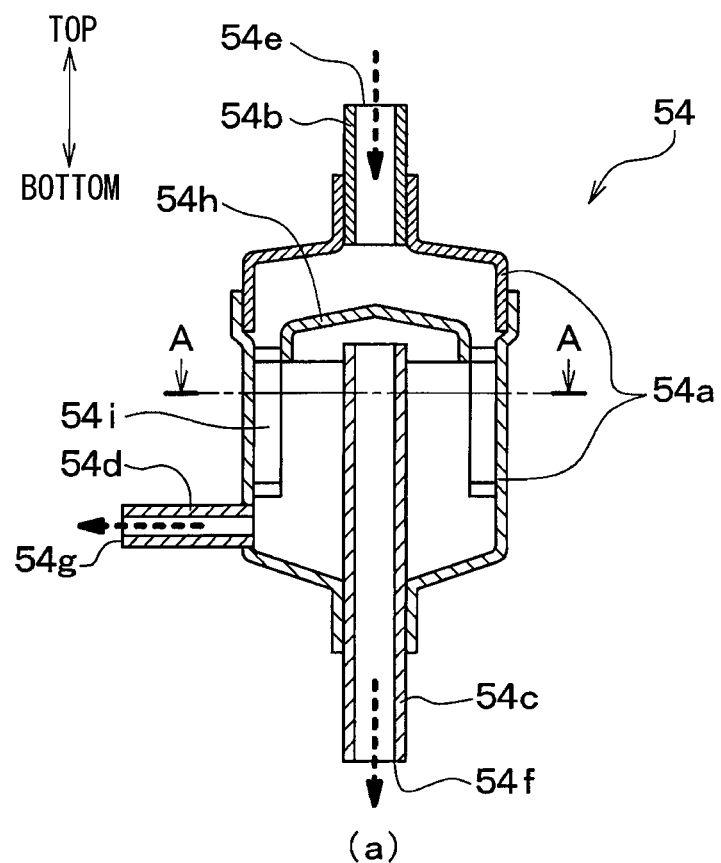
FIG. 14(a) is an axial cross-section view of a gas-liquid separator of a second embodiment.
FIG. 14(b) is a cross-section view taken on a line A-A in FIG. 14(a).
Figure 14:
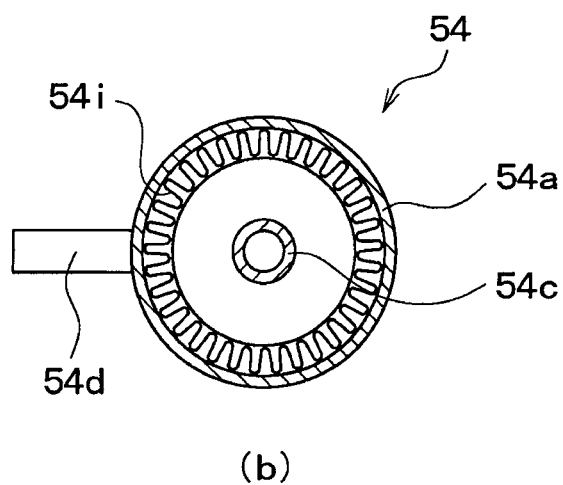

In the present embodiment, an example in which the gas-liquid separation portion is changed in comparison with the first embodiment will be described. Specifically, in the present embodiment, a gas-liquid separator 54 of a surface tension type in which the gas and liquid of the refrigerant is separated by the use of the surface tension of the liquid-phase refrigerant is employed as the gas-liquid separation part. The detailed construction of the gas-liquid separator 54 of a surface tension type will be described by the use of FIGS. 14(a) and 14(b). FIG. 14(a) is a section view in an axial direction of the gas-liquid separator 54 and FIG. 14(b) is a section view taken on a line A-A in FIG. 14(a).

The gas-liquid separator 54 of the present embodiment, as is the case with the gas-liquid separator 14 of the first embodiment, is constructed of a main body portion 54a extended in a vertical direction and formed nearly in the shape of a hollow cylinder having a closed end (having a circular section), a refrigerant flow-in port 54b having a refrigerant inlet 54e formed therein, a gas-phase refrigerant flow-out port 54c having a gas-phase refrigerant outlet 54f formed therein, and a liquid-phase refrigerant flow-out port 54d having a liquid-phase refrigerant outlet 54g formed therein.

The main body portion 54a is constructed of two parts that can be separated in the vertical direction and receives an impact plate 54h on which the refrigerant flowing from the refrigerant flow-in port 54b impacts and an adhesion plate 54i to which the liquid-phase refrigerant adheres by the use of the surface tension of the liquid-phase refrigerant. The impact plate 54h has its outer diameter formed in a dimension smaller than an inner diameter of the main body portion 54a and has its central portion formed in the shape of a cone (umbrella) tapered upward.

The adhesion plate 54i, as shown in FIG. 14(b), is formed by bending a plate, which is bent in a wavy shape, further in the shape of a cylinder when viewed from the axial direction. Further, the impact plate 54h is arranged coaxially with the main body portion 54a and is extended downward of the impact plate 54h from the outer circumferential end portion of the impact plate 54h.

In the present embodiment, by bending the plate, which is bent in the wavy shape, in the shape of the cylinder in this way, the surface area of the adhesion plate 54i is increased to thereby improve a gas-liquid separation performance. Further, in order to increase the surface area of the adhesion plate 54i, a drilling processing of forming a through hole in the adhesion plate 54i or an embossing processing of forming depressed and projected portions on the surface of the adhesion plate 54i may be performed.

The refrigerant flow-in port 54b is connected to an upper end face (top face) in the axial direction of the main body portion 54a and is constructed of a refrigerant pipe extended upward from the main body portion 54a and coaxially with the main body portion 54a. Further, a refrigerant inlet 54e is formed in an upper end portion of the refrigerant flow-in port 54b.

The gas-phase refrigerant flow-out port 54c is connected to a lower end face (bottom face) in the axial direction of the main body portion 54a and is constructed of a refrigerant pipe extended coaxially with the main body portion 54a inside and outside the main body portion 54a. Further, the gas-phase refrigerant outlet 54f is formed in a lower end portion of the gas-phase refrigerant flow-out port 54c. On the other hand, an upper end portion of the gas-phase refrigerant flow-out port 54c is positioned above the upper end portion of the adhesion plate 54i and directly below the impact plate 54h.

The liquid-phase refrigerant flow-out port 54d is connected to a cylindrical side face of the main body portion 54a and the liquid-phase refrigerant outlet 54g is formed in an opposite end portion of the main body portion 54a of the liquid-phase refrigerant flow-out port 54d.

Hence, the refrigerant flowing in from the refrigerant flow-in port 54b impacts on the impact plate 54h and hence has its flow velocity reduced and then flows to the adhesion plate 54i side on the outer circumference side of the impact plate 54h. Further, the refrigerant flowing to the adhesion plate 54i side moves downward along the adhesion plate 54i. At this time, the liquid-phase refrigerant adheres to the adhesion plate 54i by the surface tension of the liquid-phase refrigerant, whereby the gas and liquid of the refrigerant is separated from each other.

Further, the separated liquid-phase refrigerant falls downward of the main body portion 54a by the operation of gravity. The liquid-phase refrigerant separated and falling downward flows out of the liquid-phase refrigerant outlet 54g of the liquid-phase refrigerant flow-out port 54d and the separated gas-phase refrigerant flows out of the gas-phase refrigerant outlet 54f of the gas-phase refrigerant flow-out port 54c.

Further, the other rough dimensions of the gas-liquid separator 54 are the same as the gas-liquid separator 14 of the first embodiment and an inner volume of the gas-liquid separator 54 is set smaller than the volume of the excess refrigerant. In this way, the gas-liquid separator 54 as a whole is reduced in size. The other construction of the heat pump cycle 10 is the same as in the first embodiment.

Hence, also in the vehicular air conditioning device 1 of the present embodiment, various cycle constructions can be realized by switching the states of the high pressure side expansion valve 13 and the low-pressure side pressure reducing device and by switching the refrigerant passage of the heat pump cycle 10, whereby the same effect as the first embodiment such as the appropriate cooling, heating, and dehumidifying-heating of the inside of the vehicle compartment can be produced.

Further, in the heat pump cycle 10 of the present embodiment, the gas-liquid separator 54 of a surface tension type is employed as the gas-liquid separation portion and the inside volume is made smaller than the volume of the excess refrigerant, so that the size of the gas-liquid separator can be reduced and hence the ease of mounting the heat pump cycle 10 as a whole in the vehicle can be improved.

The gas-liquid separator 54 of a surface tension type employed in the heat pump cycle 10 of the present embodiment has the gas-liquid separation performance increased as the flow velocity of the refrigerant is decreased. Hence, the gas-liquid separator 54 of a surface tension type can be effectively applied to a heat pump cycle 10 operated at a comparatively low load with a high frequency.

(Third Embodiment)

In the present embodiment, an example in which the construction of the gas-liquid separation portion is changed in comparison with the first embodiment will be described. Specifically, in the present embodiment, a gas-liquid separator 55 of a centrifugal separation type in which the separated liquid-phase refrigerant is made not to remain therein but to flow out is employed as the gas-liquid separation part.

Figure 15:
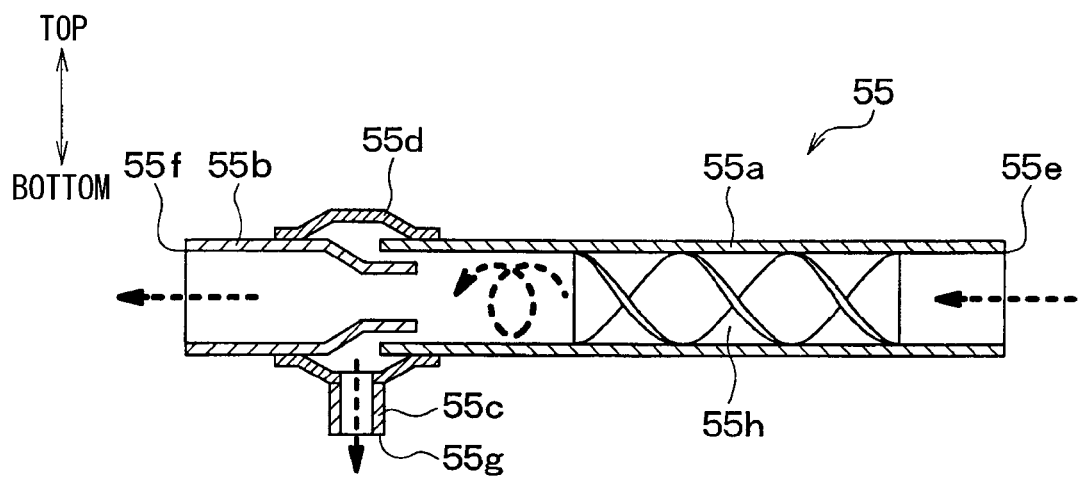
FIG. 15 is a longitudinal cross-section view of a gas-liquid separator of a third embodiment.

The specific construction of the gas-liquid separator 55 of the present embodiment will be described by the use of FIG. 15. FIG. 15 is a section view in the axial direction of the gas-liquid separator 55. The gas-liquid separator 55 is formed by working a plurality of cylindrical refrigerant pipes and is constructed by an extremely simple construction in such a way that the refrigerant is made not to remain therein but to flows out.

Specifically, the gas-liquid separator 55 is constructed of: a refrigerant flow-in pipe 55a having a refrigerant inlet 55e through which the intermediate pressure refrigerant is made to flow in; a gas-phase refrigerant flow-out pipe 55b having a refrigerant outlet 55f through which the separated gas-phase refrigerant is made to flow out; a liquid-phase refrigerant flow-out pipe 55c having a liquid-phase refrigerant outlet 55g through which the separated liquid-phase refrigerant is made to flow out; and a connection pipe 55d for connecting the refrigerant flow-in pipe 55a to the gas-phase refrigerant flow-out pipe 55b.

The refrigerant flow-in pipe 55a is formed in a shape extended in a horizontal direction and is provided with the refrigerant inlet 55e, through which the intermediate pressure refrigerant is made to flow in, at one end side thereof. Further, inside the refrigerant flow-in pipe 55a is arranged a swirl flow generating member 55h formed by twisting a plate-shaped member extended in a longitudinal direction of the refrigerant flow-in pipe 55a.

The gas-phase refrigerant flow-out pipe 55b is extended coaxially with the refrigerant flow-in pipe 55a and has its one end portion reduced in diameter and has the one end portion inserted into the other end portion of the refrigerant flow-in pipe 55a. Further, on the other end side of the gas-phase refrigerant flow-out pipe 55b is formed the refrigerant outlet 55f through which the separated gas-phase refrigerant is made to flow out. The liquid-phase refrigerant flow-out pipe 55c is extended in the vertical direction and has the liquid-phase refrigerant outlet 55g formed on the lower end side thereof.

The connection pipe 55d has both end portions reduced in diameter and the inner circumferential faces of both end portions are bonded to the outer circumferential face of the refrigerant flow-in pipe 55a and to the outer circumferential face of the gas-phase refrigerant flow-out pipe 55b by brazing or the like. Further, the connection pipe 55d has the liquid-phase refrigerant flow-out pipe 55c, through which the liquid-phase refrigerant just after separation is made to flow out, connected to its cylindrical outer circumferential face in such a way that the liquid-phase refrigerant flow-out pipe 55c is extended in the radial direction of the connection pipe 55d.

Hence, the refrigerant flowing in from the refrigerant inlet 55e formed on the one end side of the refrigerant flow-in pipe 55a swirls and flows along the swirl flow generating member 55h and the gas and liquid of the refrigerant are separated from each other by the action of a centrifugal force produced by the action of this swirl flow. The liquid-phase refrigerant separated from the gas-phase refrigerant flows to the inner circumference side of the connection pipe 55d via a clearance between an inner circumference face on the other end side of the refrigerant flow-in pipe 55a and an outer circumference face of one end portion reduced in diameter of the gas-phase refrigerant flow-out pipe 55b.

The liquid-phase refrigerant flowing to the inner circumference side of the connection pipe 55d flows out of the liquid-phase refrigerant outlet 55g of the liquid-phase refrigerant flow-out pipe 55c. On the other hand, the separated gas-phase refrigerant flows out of the gas-phase outlet 55f of the gas-phase flow-out pipe 55b.

In short, in the gas-liquid separator 55, the separated liquid-phase refrigerant is not made to remain therein but flows out of the liquid-phase refrigerant flow-out pipe 55c. In other words, in the gas-liquid separator 55, the liquid-phase refrigerant just after separation flows out of the liquid-phase refrigerant outlet 55g. Here, "the liquid-phase refrigerant just after separation" includes the liquid-phase refrigerant having a velocity component in a direction flowing out of the gas-liquid separator 55 or the liquid-phase refrigerant in which the centrifugal force applied to the refrigerant so as to separate the refrigerant into gas and liquid becomes larger than the gravity.

Further, the gas-liquid separator 55 does not have the function of storing the separated liquid-phase refrigerant, so that the inner volume of the gas-liquid separator 55 is set greatly smaller than the volume of the excess refrigerant as compared with the gas-liquid separators 14, 54 of the first and the second embodiments.

The other construction of the heat pump cycle 10 is the same as the first embodiment. Hence, also in the vehicular air conditioning device 1 of the present embodiment, by switching the states of the high pressure side expansion valve 13 and the low-pressure side pressure reducing device and by switching the refrigerant flow passage of the heat pump cycle 10, various cycle constructions can be realized and the same effects as in the first embodiment such as the appropriate cooling, heating, and the dehumidifying-heating of the inside of the vehicle compartment can be produced.

Further, in the heat pump cycle 10 of the present embodiment, the gas-liquid separator 55, which is of the centrifugal separation type and makes the separated liquid-phase refrigerant not to remain therein but to flow out therefrom, is employed as the gas-liquid separation part, so that the size of the gas-liquid separation portion can be reduced and hence the ease of mounting the heat pump cycle 10 as a whole in the vehicle can be improved.

In the present embodiment, as shown in FIG. 15, has been described the following example: that is, the refrigerant flow-in pipe 55a and the gas-phase flow-out pipe 55b of the gas-liquid separator 55 are arranged in such a way as to be extended in the horizontal direction and the liquid-phase flow-out pipe 55c is arranged in such a way as to be extended in the vertical direction, whereby the liquid-phase refrigerant outlet 55g is positioned in the lowest portion of the gas-liquid separator 55. However, the arrangement of the gas-liquid separator 55 of the present embodiment is not limited to this.

In short, in the gas-liquid separator 55 of the present embodiment, the refrigerant just after the separation is made to flow out of the liquid-phase refrigerant outlet 55g, so that regardless of the direction of arrangement, the refrigerant can be separated into gas and liquid and the liquid-phase refrigerant can be made not to remain in the gas-liquid separator 55 but to flow out of the gas-liquid separator 55.

Figure 16:
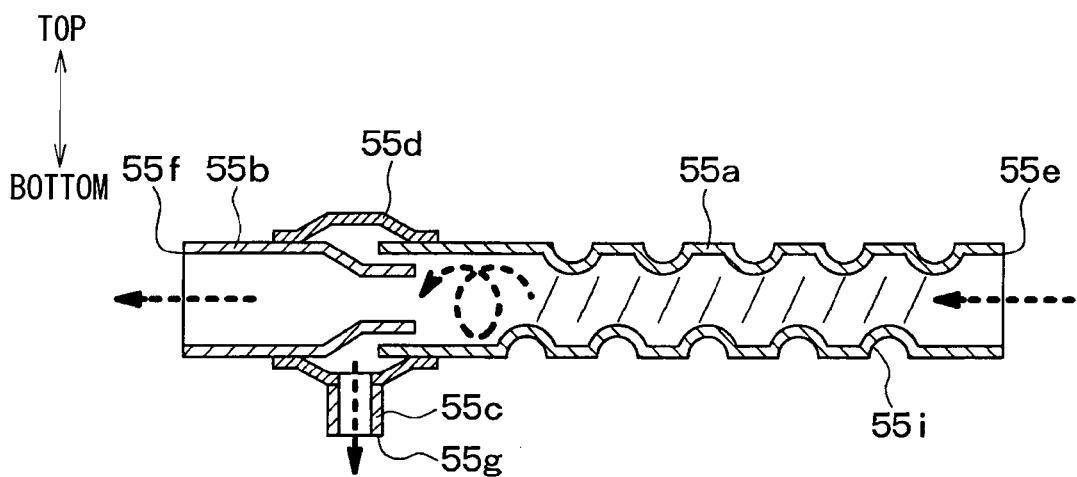
FIG. 16 is a longitudinal section view to show a modified example of the gas-liquid separator of the third embodiment.

Further, in the present embodiment has been described the example in which, in order to swirl the intermediate pressure refrigerant flowing into the refrigerant flow-in pipe 55a, the swirl flow generating member 55h is arranged in the refrigerant flow-in pipe 55a, but the flow of the intermediate pressure refrigerant flowing into the refrigerant flow-in pipe 55a may be swirled by the use of the other construction. For example, as shown in FIG. 16, the refrigerant flow-in pipe 55a may have a helical groove 55i formed therein.

More specifically, the helical groove 55i is formed in such a way as to protrude from the outer circumference side to the inner circumference side of the refrigerant flow-in pipe 55a and in such a way as to be connected helically from one end side to the other end side of the refrigerant flow-in pipe 55a. FIG. 16 is a drawing to show a modified example of the gas-liquid separator 55 of the present embodiment and corresponds to FIG. 15. Further, in FIG. 16, parts equal or equivalent to those in FIG. 15 are denoted by the same reference symbols.

(Fourth Embodiment)

Figure 17:
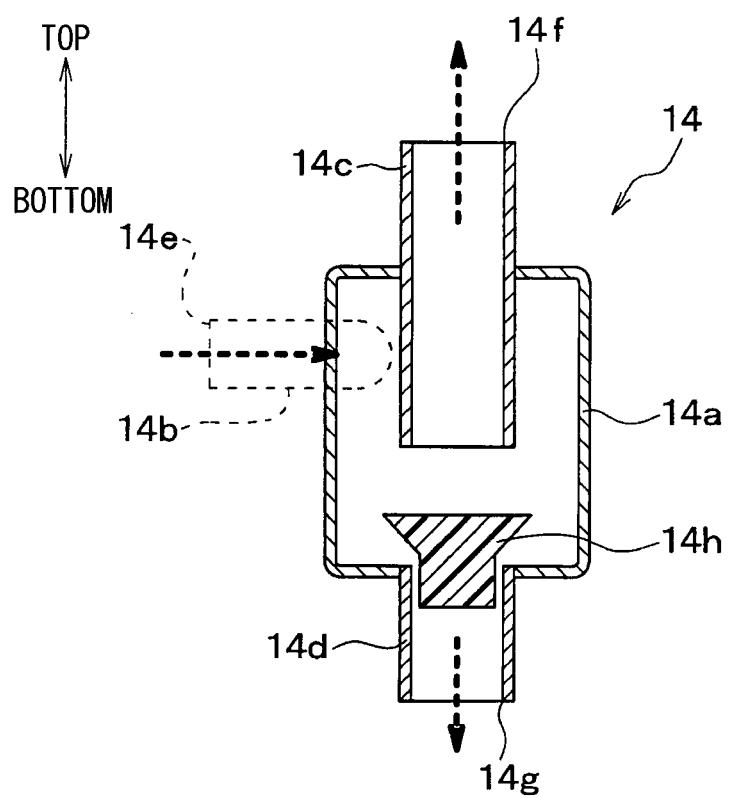
FIG. 17 is an axial section view of a gas-liquid separator of a fourth embodiment.

A gas-liquid separator 14 of the present embodiment, in compared with the gas-liquid separator 14 in the first embodiment, as shown in FIG. 17, is additionally provided with a float valve 14h displaced according to the height of a liquid level of the liquid-phase refrigerant in the gas-liquid separator 14 and is further reduced in the inner volume. FIG. 17 is a section view in the axial direction of the gas-liquid separator 14 of the present embodiment and parts equal or equivalent to those in FIGS. 4(a) and 4(b) are denoted by the same reference symbols.

Specifically, the float valve 14h in the gas-liquid separator 14 of the present embodiment is made of resin having a smaller specific weight than the liquid-phase refrigerant and floats up by buoyancy when even a small amount of the liquid-phase refrigerant remains in the gas-liquid separator 14 to thereby open the liquid-phase refrigerant outlet 14g (specifically, an upper end portion of the liquid-phase refrigerant flow-out port 14d).

Further, in the gas-liquid separator 14 of the present embodiment, not only the liquid-phase refrigerant outlet 14g is positioned in the lowest portion of the gas-liquid separator 14 but its inner volume is made smaller than the first embodiment, so that when the float valve 14h opens the liquid-phase refrigerant outlet 14g, a part of the gas-phase refrigerant flows out of the liquid-phase refrigerant outlet 14g together with the liquid-phase refrigerant.

Hence, in the gas-liquid separator 14 of the present embodiment, when the float valve 14h opens the liquid-phase refrigerant outlet 14g, the liquid-phase refrigerant can be made to effectively flow out of the liquid-phase refrigerant outlet 14g by the use of the action of the gravity and the back pressure of the gas-phase refrigerant.

In short, the gas-liquid separator 14 of the present embodiment is constructed in the following manner: that is, the float valve 14h opens a liquid-phase refrigerant outlet 56g at the same time when the liquid-phase refrigerant starts to remain in the gas-liquid separator 14, thereby making the separated liquid-phase refrigerant not remain therein but flow out of the liquid-phase refrigerant outlet 14g.

Even if a part of the gas-phase refrigerant flows out of the liquid-phase refrigerant outlet 14g together with the liquid-phase refrigerant like the gas-liquid separator 14 of the present embodiment, since the flow rate characteristics of the low pressure side fixed throttle 17 is set as described in FIG. 6(a), the COP of the cycle as a whole is not reduced.

The other construction of the heat pump cycle 10 is the same as the first embodiment. Hence, also in the vehicular air conditioning device 1 of the present embodiment, by switching the states of the high pressure side expansion valve 13 and the low-pressure side pressure reducing device and by switching the refrigerant flow passage of the heat pump cycle 10, various cycle constructions can be realized and the same effects as in the first embodiment such as the appropriate cooling, heating, and dehumidifying-heating of the inside of the vehicle compartment can be produced.

Further, in the heat pump cycle 10 of the present embodiment is employed the gas-liquid separator 14 of the centrifugal separation type in which the float valve is employed as the gas-liquid separation portion and in which the inner volume is decreased, so that the size of the gas-liquid separation portion can be reduced and hence the ease of mounting the heat pump cycle 10 as a whole in the vehicle can be improved.

In the present embodiment has been described the example in which the float valve is added to the gas-liquid separation portion of the centrifugal separation type. However, of course, a gas-liquid separator may be employed in which the float valve is added to the surface tension type gas-liquid separator 54 described in the second embodiment and to the other type gas-liquid separator (for example, the impact type gas-liquid separator).

Further, in the gas-liquid separators 54, 55 described in the second and the third embodiments, in order to effectively make the liquid-phase refrigerant flow out of the gas-liquid separators 54, 55, a part of the gas-phase refrigerant may be made to flow out of the liquid-phase refrigerant outlets 54g, 55g together with the liquid-phase refrigerant.

(Fifth Embodiment)

In the present embodiment will be described an example in which the cycle construction of the heat pump cycle 10 is changed in comparison with the first embodiment. The heat pump cycle 10 of the present embodiment is constructed in such a way that the heat of the high pressure refrigerant discharged from the discharge port 11c of the compressor 11 is not radiated directly to the blown air but is radiated to the blown air via a heating medium made of antifreeze or the like.

Figure 18:
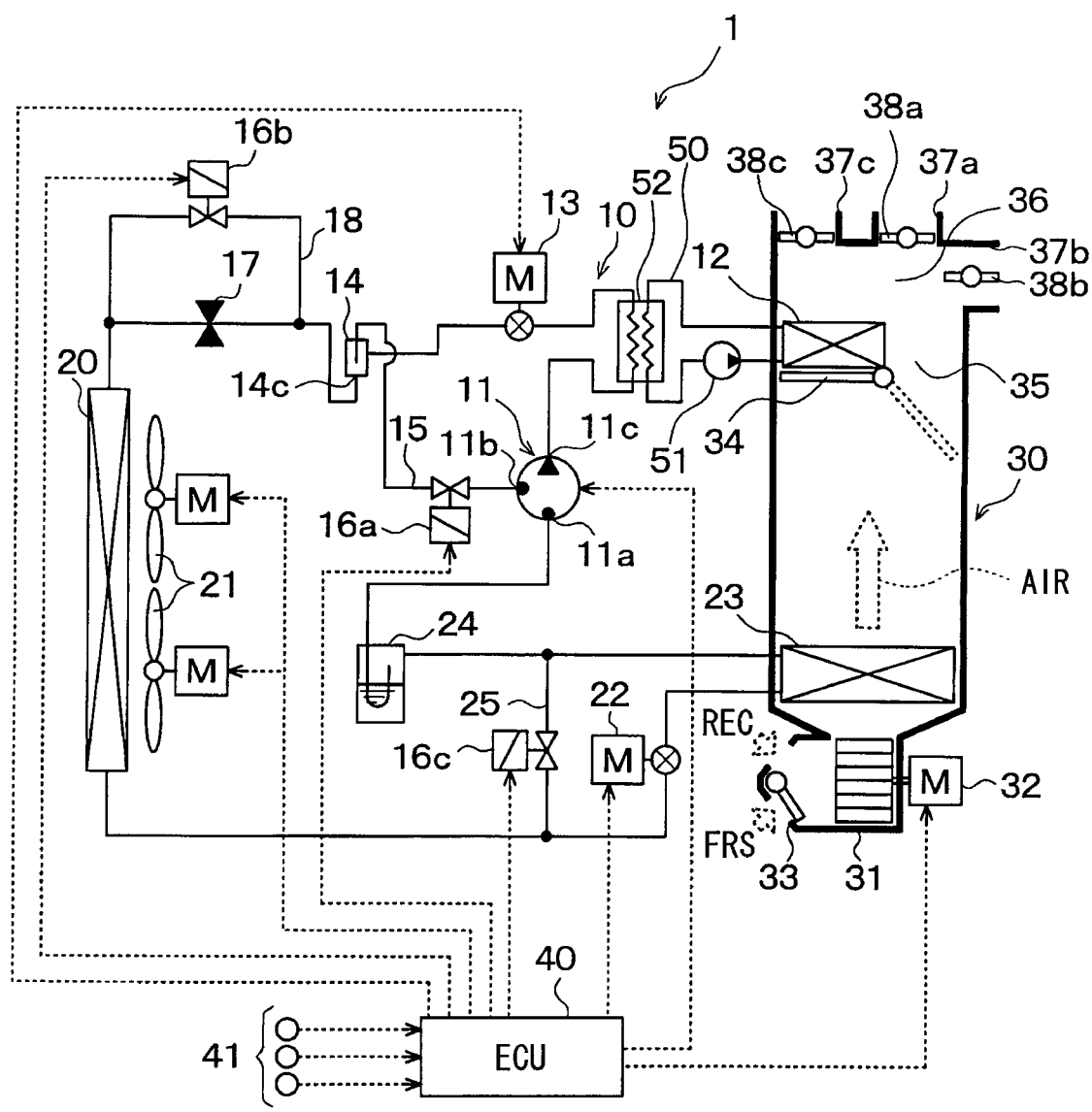
FIG. 18 is a general construction diagram to show a heat pump cycle of a fifth embodiment.

Specifically, as shown by a general construction diagram in FIG. 18, the heat pump cycle 10 is provided with a refrigerant radiator 52 for radiating the heat of the high pressure refrigerant discharged from the discharge port 11c of the compressor 11 to a heating medium for heating the blown air.

Further, in the inside air conditioning unit 30 is arranged a heating heat exchanger 12 for radiating the heat of the heating medium heated by the refrigerant radiator 52 to the blown air to thereby heat the blown air. The heating heat exchanger 12 is connected to the refrigerant radiator 52 via a heating medium circulation circuit 50, thereby having the heating medium press-fed thereto by a pressure pump 51 disposed in the heating medium circulation circuit 50.

The heat pump cycle 10 constructed in this way is constructed in such a way that the refrigerant radiator 52 is arranged outside the inside air conditioning unit 30, so the heat pump cycle 10 of the present discloser can be applied without changing the inner construction of the current inside air conditioning unit 30. This is effective in terms of reducing the cost of constructing the system of an air conditioning device.

(Sixth Embodiment)

In the present embodiment will be described an example in which the construction of the intermediate pressure opening/closing valve 16a is changed in comparison with the first embodiment. In the present embodiment, the intermediate pressure opening/closing valve 16a is constructed of a pressure difference opening/closing valve for opening and closing the intermediate pressure refrigerant passage 15 according to a pressure difference between before and after the low pressure side fixed throttle 17 of the low-pressure side pressure reducing device.

The intermediate pressure opening/closing valve 16a of the present embodiment is constructed of the pressure difference opening/closing valve for closing the intermediate pressure refrigerant passage 15 when a pressure difference between before and after the low pressure side fixed throttle 17 is a given set pressure α or more.

Figure 19:
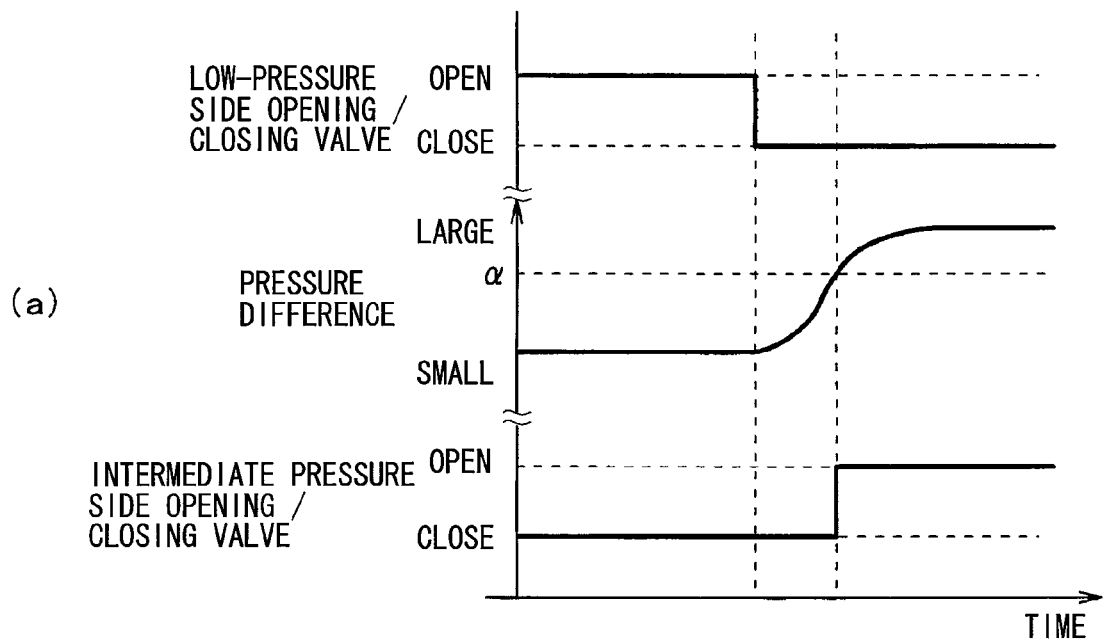
FIGS. 19(a) and 19(b) are illustrations to illustrate an operation of an intermediate pressure side opening/closing valve of a sixth embodiment.
Figure 19:
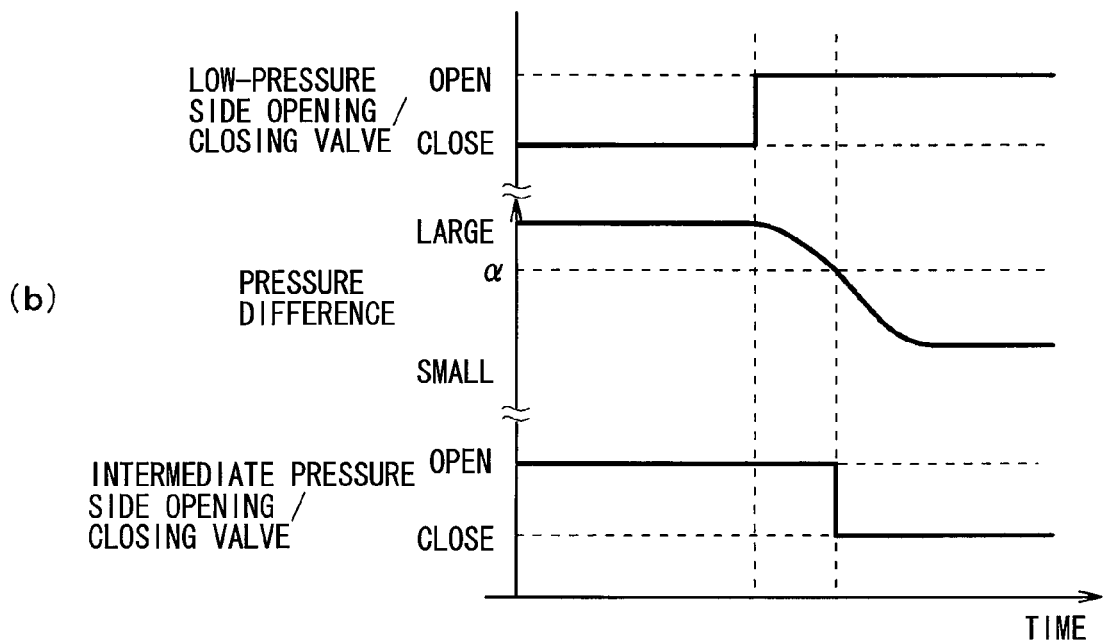

Specifically, the intermediate pressure opening/closing valve 16a, as shown in FIG. 19(a), is constructed in the following manner: that is, when the low pressure side opening/closing valve 16b of the low-pressure side pressure reducing device is closed and the pressure difference between before and after the low pressure side fixed throttle 17 is increased and made the given set pressure a or more, the intermediate pressure opening/closing valve 16a opens the intermediate pressure refrigerant passage 15.

Further, the intermediate pressure opening/closing valve 16a, as shown in FIG. 19(b), is constructed in the following manner: that is, when the low pressure side opening/closing valve 16b of the low-pressure side pressure reducing device is opened and the pressure difference between before and after the low pressure side fixed throttle 17 is decreased and made smaller than the given set pressure a, the intermediate pressure opening/closing valve 16a closes the intermediate pressure refrigerant passage 15. FIG. 19(a) shows an operation when the intermediate pressure opening/closing valve 16a is opened and FIG. 19(b) shows an operation when the intermediate pressure opening/closing valve 16a is closed.

Figure 20:
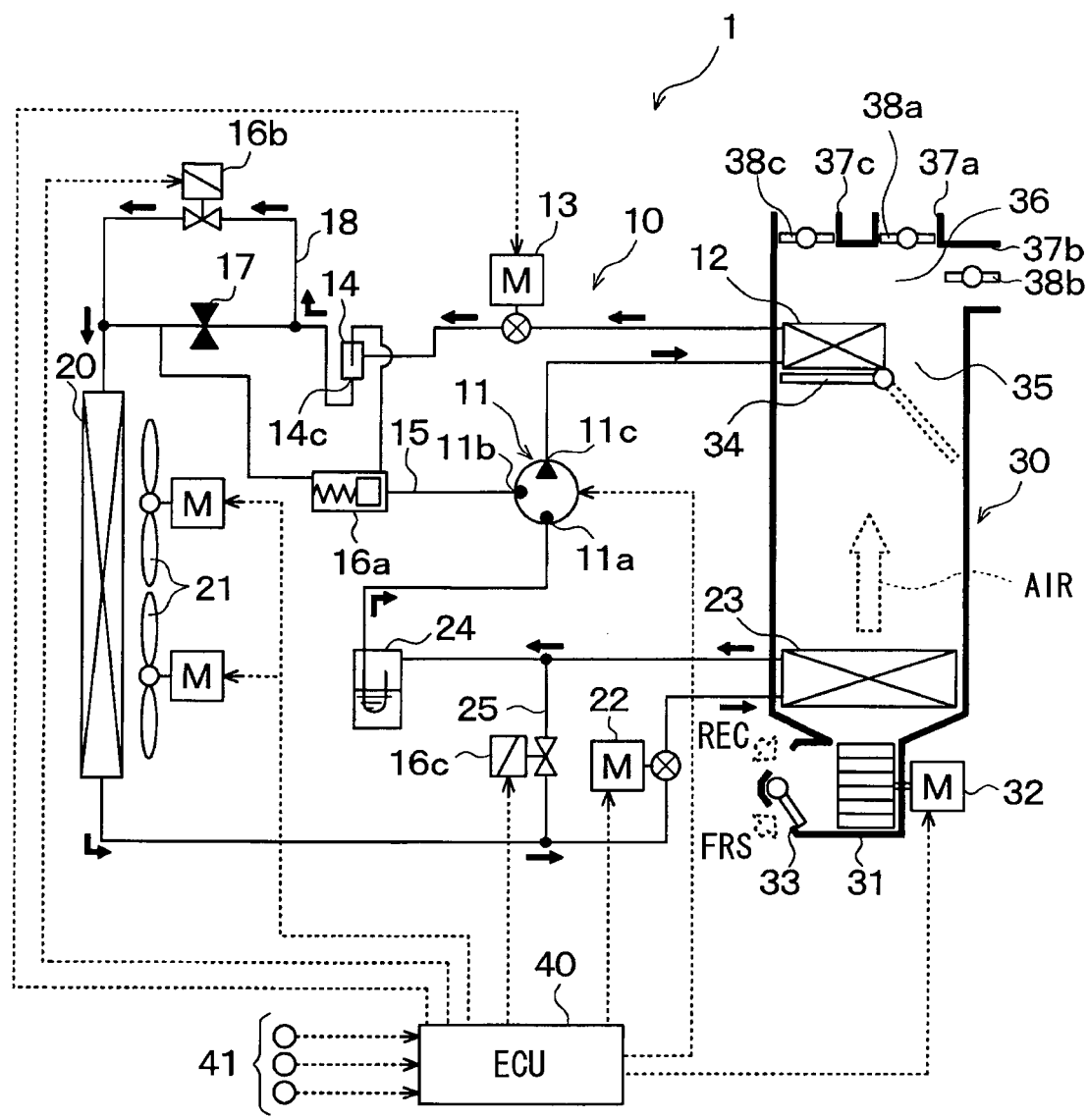
FIG. 20 is a general construction diagram to show a refrigerant flow passage in a cooling operation mode of a heat pump cycle of the sixth embodiment.

In the heat pump cycle 10 of the present embodiment constructed in this way, in the cooling operation mode and the dehumidifying-heating operation mode in which the low pressure side opening/closing valve 16b is put into the opened state to thereby put the low-pressure side pressure reducing device into the fully open state in which the low-pressure side pressure reducing device does not perform the pressure reducing operation, the pressure difference between before and after the low pressure side fixed throttle 17 is made smaller than the set pressure α and the intermediate pressure opening/closing valve 16a is closed. In this way, the heat pump cycle 10, as shown by a general construction diagram (solid arrows) in FIG. 20, is switched to the refrigerant flow passage of the normal cycle in which the refrigerant does not flow in the intermediate pressure refrigerant passage 15.

Figure 21:
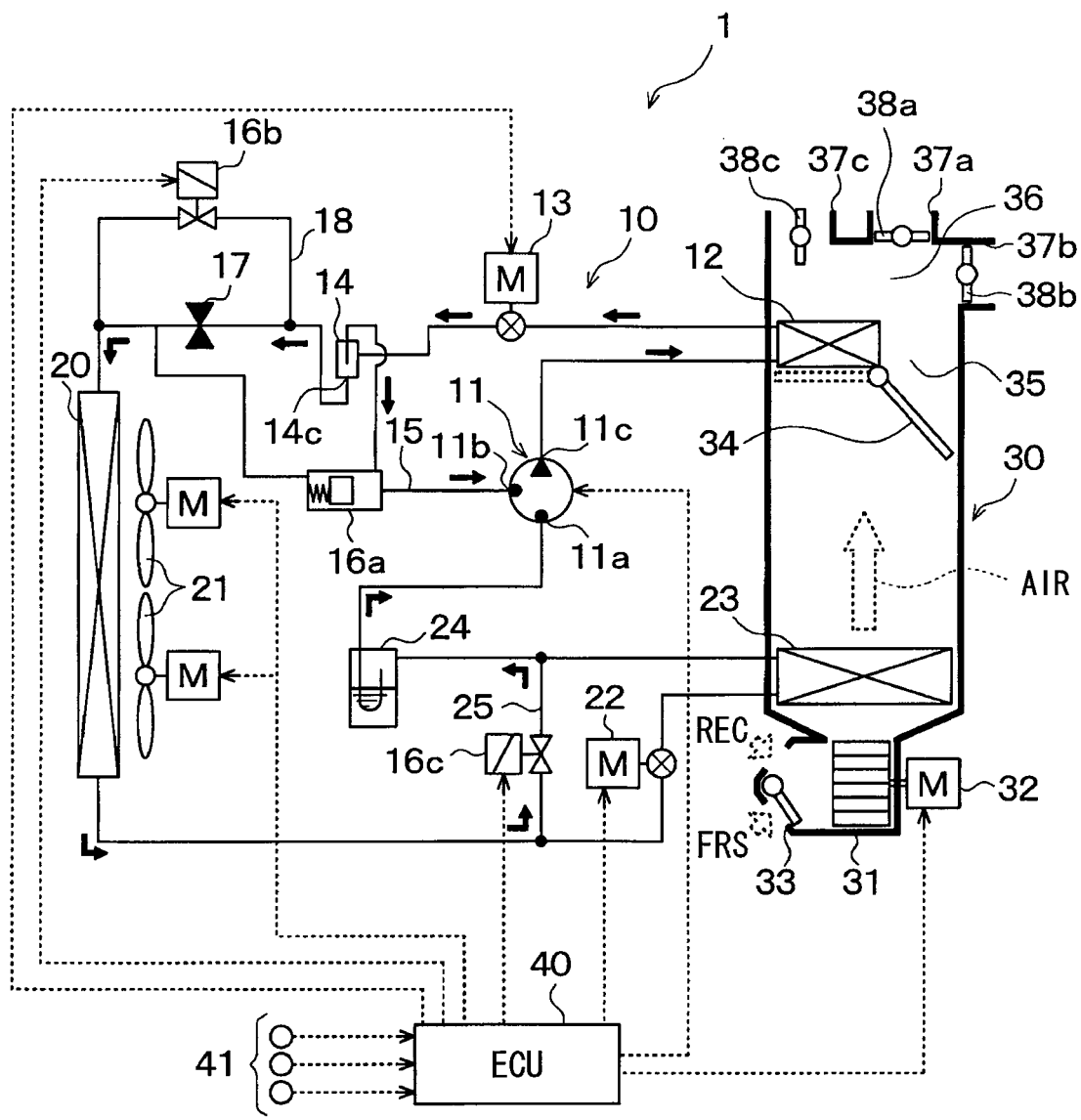
FIG. 21 is a general construction diagram to show a refrigerant flow passage in a heating operation mode of the heat pump cycle of the sixth embodiment.

Further, in the heat pump cycle 10 of the present embodiment constructed, in the heating operation mode in which the low pressure side opening/closing valve 16b is put into the closed state to thereby put the low-pressure side pressure reducing device into the throttled state in which the low-pressure side pressure reducing device performs the pressure reducing operation, the pressure difference between before and after the low pressure side fixed throttle 17 is made the set pressure a or more and the intermediate pressure opening/closing valve 16a is opened. In this way, the heat pump cycle 10, as shown by a general construction diagram (solid arrows) in FIG. 21, is switched to the refrigerant flow passage of the gas injection cycle in which the refrigerant flows in the intermediate pressure refrigerant passage 15.

When the intermediate pressure opening/closing valve 16a is constructed of the pressure difference opening/closing valve like the present embodiment, switching between the gas injection cycle and the normal cycle can be realized by a simple construction and a simple control technique.

(Other Embodiments)

The present disclosure is not limited to the embodiments described above but can be variously modified in the following manner within a scope not departing from the gist of the present disclosure.

(1) In the embodiments described above have been described the examples in which the heat pump cycle 10 of the present disclosure is applied to the vehicular air conditioning device 1, but the application of the present disclosure is not limited to these. The present disclosure may be applied to, for example, a stationary air conditioning device and a cold temperature storage.

(2) In the embodiments described above have been described the heat pump cycle 10 capable of realizing various operation modes by switching the states of the high pressure side expansion valve 13 and the low-pressure side pressure reducing device and by switching the refrigerant flow passage of the heat pump cycle 10, but the present disclosure is not limited to this. The heat pump cycle 10 may be constructed in such a way as to realize at least three operation modes of the heating operation mode, the cooling operation mode, and the dehumidifying-heating operation mode. Of course, the heat pump cycle 10 constructed in such a way as to perform various operation modes in each of the operation modes is more effective in terms of the appropriate temperature control of the blown air.

(3) In the embodiments described above have been described the examples in which switching between the first heating mode and the second heating mode is made according to the number of revolutions of the compressor 11 in the heating operation mode, but the switching between the first heating mode and the second heating mode is not limited to this. In other words, as to the switching between the first heating mode and the second heating mode, it is only necessary to switch the heating operation mode to the heating mode capable of producing the higher COP of the first and second heating modes.

For example, in the case where the detection value of the outside air temperature is a predetermined base outside air temperature (for example, 0° C.) or lower, the first heating mode may be performed on the basis of the detection value of the outside air temperature sensor, whereas in the case where the detection value of the outside air temperature is higher than the predetermined base outside air temperature, the second heating mode may be performed on the basis of the detection value of the outside air temperature sensor.

(4) In the embodiments described above have been described the examples in which the air conditioning control unit 40 activates the air mixing door 34 in such a way as to close either the air passage of the inside condenser 12 or the bypass passage 35 in the respective operation modes of the cooling operation mode, the heating operation mode, and the dehumidifying-heating operation mode, but the operation of the air mixing door 34 is not limited to this.

That is, the air mixing door 34 may open both of the air passage of the inside condenser 12 and the bypass passage 35. In other words, the air mixing door 34 may regulate the air volume ratio of the air volume passing through the inside condenser 12 to the air volume passing through the bypass passage 35, thereby regulating the temperature of the blown air blown off into the vehicle compartment from the mixing space 36. This temperature control is effective in terms of easily and finely regulating the temperature of the air to be blown into the vehicle compartment.

(5) As described in the respective embodiments, the examples have been described in which the high-pressure side pressure reducing device (first pressure reducing part) is constructed of the high pressure side expansion valve 13 made of the variable throttle mechanism and in which the low-pressure side pressure reducing device (second pressure reducing part) is constructed of the low pressure side fixed throttle 17. However, any kind of pressure reducing portion can be applied to the high-pressure side pressure reducing device (first pressure reducing part) and the low-pressure side pressure reducing device (second pressure reducing part), if the pressure reducing portion can set at least the throttled state in which the pressure reducing portion performs the pressure reducing operation and the fully open state in which the pressure reducing portion does not perform the pressure reducing operation.

For example, both of the high-pressure side pressure reducing device (first pressure reducing part) and the low-pressure side pressure reducing device (second pressure reducing part) may be constructed of the same construction as the high pressure side expansion valve 13 (variable throttle mechanism having a full opening function).

Further, both of the high-pressure side pressure reducing device (first pressure reducing part) and the low-pressure side pressure reducing device (second pressure reducing part) may be constructed of a fixed throttle, a bypass passage for bypassing the fixed throttle, and a passage opening/closing valve for opening/closing the bypass passage.

Still further, the high-pressure side pressure reducing device (first pressure reducing part) may be constructed of the fixed throttle, the bypass passage for bypassing the fixed throttle, and the passage opening/closing valve for opening/closing the bypass passage, whereas the low-pressure side pressure reducing device (second pressure reducing part) may be constructed of the variable throttle mechanism.

In the case where the high-pressure side pressure reducing device is constructed of the variable throttle mechanism, the construction is effective in that when the gas injection is realized by the heat pump cycle 10, the pressure of the refrigerant flowing into the gas-liquid separators 14, 54, 55 can be reduced to a desired intermediate pressure.

Still further, in the case where the low-pressure side pressure reducing device is constructed of the variable throttle mechanism, it is desired to set the flow rate characteristics in such a way that the quality fraction dryness X of the refrigerant flowing into the outside heat exchanger 20 becomes 0.1 or less in the heating operation mode. In this case, it is only necessary that the air conditioning unit 40 detects the quality fraction dryness X of the refrigerant flowing into the outside heat exchanger 20 on the basis of the temperature and the pressure of the refrigerant flowing into the outside heat exchanger 20 and controls the opening of the variable throttle mechanism for constructing the low-pressure side pressure reducing device in such a way that the detection value of the quality fraction dryness X becomes 0.1 or less.

(6) In the embodiments described above have been described the examples in which the first dehumidifying-heating mode is switched stepwise to the fourth dehumidifying-heating mode according to an increase in the target air temperature TAO in the dehumidifying-heating operation mode, but the switching from the first dehumidifying-heating mode to the fourth dehumidifying-heating mode is not limited to this. For example, the first dehumidifying-heating mode may be switched continuously to the fourth dehumidifying-heating mode according to the increase in the target air temperature TAO.

That is, it is only necessary to gradually decrease the throttle opening of the high pressure side expansion valve 13 and to gradually increase the throttle opening of the cooling expansion valve 22 according to the increase in the target air temperature TAO. By changing the throttle openings of the high pressure side expansion valve 13 and the cooling expansion valve 22, the pressure (temperature) of the refrigerant in the outside heat exchanger 20 can be regulated and hence the outside heat exchanger 20 can be automatically changed from the state in which the outside heat exchanger 20 is operated as the heat radiator to the state in which the outside heat exchanger 20 is operated as the evaporator.

(7) As described in the respective embodiments, in order to realize the fine temperature regulation of the blown air in the respective operation modes of the air conditioning device 1, it is desired that the intermediate pressure refrigerant passage 15 is provided with the intermediate pressure side opening/closing valve 16a but the construction is not limited to this. The respective operation modes may be realized by a simple construction not including the intermediate pressure side opening/closing valve 16a.

(8) It is desired that the respective gas-liquid separators 14, 54, 55 described in the respective embodiments are applied to the heat pump cycle 10, but the construction is not limited to this. A gas-liquid separator capable of storing the refrigerant to become excess may be applied to the heat pump cycle 10.

In the respective embodiments, in the cooling operation mode, the refrigerant flow passage for passing the refrigerant discharged from the compressor 11 through the inside condenser 12 and the refrigerant radiator 52 is employed. However, in the cooling operation mode, the heat of the refrigerant can be radiated to the outside air in the outside heat exchanger 20 and hence the refrigerant flow passage that does not pass the refrigerant through the inside condenser 12 and the refrigerant radiator 52 may be employed.

(10) In the respective embodiments is employed the construction in which the accumulator 24 is arranged on the outlet side of the inside evaporator 23 in the heat pump cycle 10, but the construction is not limited to this. For example, in the case where the heat pump cycle 10 is provided with a gas-liquid separator capable of storing the refrigerant to become excess, the accumulator 24 may be eliminated. In this way, the cycle construction can be simplified.

Although the present disclosure has been described with reference to the embodiments, but it should be understood that the present disclosure is not limited to the embodiments and the structures. The present disclosure includes various modified examples and modifications within an equivalent scope. In addition, various combinations and modes, and further other combinations and modes including only one element, or one or more or less elements added thereto also fall within the scope of the present disclosure and the scope of idea of the present disclosure.

The invention claimed is:

1. A heat pump cycle capable of switching an operation mode to a cooling operation mode, a heating operation mode, and a dehumidifying-heating operation mode, and applicable to an air conditioning device, the heat pump cycle comprising:
   a compressor sucking, compressing and discharging a refrigerant;
   a first usage side heat exchanger making a high pressure refrigerant discharged from a discharge port of the compressor exchange heat with air to be blown into a space to be air-conditioned or exchange heat with a heating medium for heating the air;
   a first pressure reducing portion configured to reduce pressure of the refrigerant flowing out of the first usage side heat exchanger;
   a gas-liquid separation portion separating gas and liquid of the refrigerant having passed through the first pressure reducing portion;
   a second pressure reducing portion configured to reduce pressure of a liquid-phase refrigerant separated by the gas-liquid separation portion;
   an outside heat exchanger making the refrigerant passing the second pressure reducing portion exchange heat with an outside air;
   a second usage side heat exchanger making the refrigerant exchange heat with the air to be blown into the space and making the refrigerant flow out toward a suction port of the compressor;
   a third pressure reducing portion reducing pressure of the refrigerant flowing into the second usage side heat exchanger;
   an intermediate pressure refrigerant passage guiding a gas-phase refrigerant separated by the gas-liquid separation portion to an intermediate pressure port provided in the compressor to thereby mix the gas-phase refrigerant with the refrigerant in a compression process of the compressor; and
   a refrigerant flow passage switching device switching a refrigerant flow passage of the refrigerant circulated in the cycle, wherein
   each of the first pressure reducing portion and the second pressure reducing portion is configured to be set not only in a throttled state in which each of the first pressure reducing portion and the second pressure reducing portion performs a pressure reducing operation but also in a fully open state in which each of the first pressure reducing portion and the second pressure reducing portion does not perform the pressure reducing operation;
   in the heating operation mode, both of the first pressure reducing portion and the second pressure reducing portion are set in the throttled state,
   in the cooling operation mode, both of the first pressure reducing portion and the second pressure reducing portion are set in the fully open state, and
   in the humidifying-heating operation mode, at least one of the first pressure reducing portion and the second pressure reducing portion is set in the fully open state.

2. The heat pump cycle as in claim 1, wherein
   in the heating operation mode, the refrigerant flow passage switching device causes the refrigerant discharged from the compressor to flow through the first usage side heat exchanger→the first pressure reducing portion→the gas-liquid separation portion→the second pressure reducing portion→the outside heat exchanger in sequence and causes the gas-phase refrigerant separated by the gas-liquid separation portion to flow into the intermediate pressure refrigerant passage,
   in the cooling operation mode, the refrigerant flow passage switching device causes the refrigerant discharged from the compressor to flow through the first pressure reducing portion→the gas-liquid separation portion→the second pressure reducing portion→the outside heat exchanger→the third pressure reducing portion→the second usage side heat exchanger in sequence, and
   in the dehumidifying-heating operation mode, the refrigerant flow passage switching device causes the refrigerant discharged from the compressor to flow through the first usage side heat exchanger→the first pressure reducing portion→the gas-liquid separation portion→the second pressure reducing portion→the outside heat exchanger→the third pressure reducing portion→the second usage side heat exchanger in sequence.

3. The heat pump cycle as in claim 1, wherein
the refrigerant flow passage switching device includes an intermediate pressure side opening/closing valve for opening and closing the intermediate pressure refrigerant passage.

4. The heat pump cycle as in claim 3, wherein
the intermediate pressure side opening/ closing valve is configured to open the intermediate pressure refrigerant passage when both of the first pressure reducing portion and the second pressure reducing portion are set in the throttled state, and to close the intermediate pressure refrigerant passage when at least one of the first pressure reducing portion and the second pressure reducing portion is set in the fully open state.

5. The heat pump cycle as in claim 4, wherein
the intermediate pressure side opening/ closing valve is a pressure difference opening/ closing valve that is open and closed according to a pressure difference between before and after the second pressure reducing portion, which is set in the fully open state in the dehumidifying-heating operation mode, of the first pressure reducing portion and the second pressure reducing portion.

6. The heat pump cycle as in claim 1, wherein
one of the first pressure reducing portion and the second pressure reducing portion is constructed of a variable throttle mechanism capable of varying a throttle opening,
the third pressure reducing portion is constructed of a variable throttle mechanism capable of varying a throttle opening, and
in the dehumidifying-heating operation mode, the other of the first pressure reducing portion and the second pressure reducing portion is set in the fully open state, and the one of the first pressure reducing portion and the second pressure reducing portion has its throttle opening that is changed to decrease in accordance with an increase in a target temperature of air to be blown into the space and the third pressure reducing portion has its throttle opening changed to increase in accordance with the increase in the target temperature of air to be blown into the space.

7. The heat pump cycle as in claim 1,
wherein at least one of the first pressure reducing portion and the second pressure reducing portion includes a fixed throttle having a fixed throttle opening, a fixed throttle bypassing passage through which the refrigerant flows while bypassing the fixed throttle, and a passage opening/ closing valve for opening and closing the fixed throttle bypassing passage.

8. The heat pump cycle as in claim 1, wherein
the first pressure reducing portion is constructed of a variable throttle mechanism capable of varying a throttle opening, and
the second pressure reducing portion is constructed of a fixed throttle having a fixed throttle opening, a fixed throttle bypassing passage through which the refrigerant bypasses the fixed throttle, and a passage opening/ closing valve for opening and closing the fixed throttle bypassing passage.

9. The heat pump cycle as in claim 1, further comprising
an accumulator for separating gas and liquid of the refrigerant flowing toward the suction port of the compressor and for causing a separated gas-phase refrigerant to flow into a side of the suction port of the compressor, wherein
the gas-liquid separation portion is configured to make a separated liquid-phase refrigerant not remain therein but flow out of a liquid-phase refrigerant outlet of the gas-liquid separation portion.

10. The heat pump cycle as in claim 1, further comprising
an accumulator for separating gas and liquid of the refrigerant flowing toward the suction port of the compressor and for causing a separated gas-phase refrigerant to flow into a side of the suction port of the compressor,
wherein the gas-liquid separation portion has a liquid-phase refrigerant outlet through which a liquid-phase refrigerant just after separation is made to flow out.

11. The heat pump cycle as in claim 9,
wherein the gas-liquid separation portion is a centrifugal-separation type gas-liquid separator in which gas and liquid of the refrigerant is separated by a centrifugal force.

12. The heat pump cycle as in claim 9,
wherein the liquid-phase refrigerant outlet is positioned on a lower side than a gas-phase refrigerant outlet through which the gas-phase refrigerant separated by the gas-liquid separation portion is made to flow out, and the liquid-phase refrigerant outlet makes a part of the gas-phase refrigerant flow out together with the liquid-phase refrigerant.

13. The heat pump cycle as in claim 1,
wherein the first usage side heat exchanger is a heat exchanger in which the high pressure refrigerant discharged from the discharge port of the compressor exchanges heat with the air to be blown into the space.

14. The heat pump cycle as in claim 1,
wherein the first usage side heat exchanger is a heat exchanger in which the high pressure refrigerant discharged from the discharge port of the compressor exchanges heat with a heating medium for heating the air.

15. The heat pump cycle as in claim 13,
wherein in the heating operation mode, the air heated by the first usage side heat exchanger is blown to the space to be air-conditioned.

16. The heat pump cycle as in claim 13, further comprising
a heat exchange capacity regulation portion regulating a heat exchange capacity of the first usage side heat exchanger, wherein
in the cooling operation mode, the heat exchange capacity regulation portion reduces a heat exchange capacity in the first usage side heat exchanger such that the air cooled by the second usage side heat exchanger is blown to the space to be air-conditioned.

17. The heat pump cycle as in claim 13, wherein
the second usage side heat exchanger is arranged at an upstream side of the first usage side heat exchanger in an air flow, and
in the dehumidifying-heating operation mode, the air cooled by the second usage side heat exchanger is heated by the first usage side heat exchanger and is blown to the space to be air-conditioned.

18. A heat pump cycle capable of switching an operation mode to a cooling operation mode, a heating operation mode, and a dehumidifying-heating operation mode, and applicable to an air conditioning device, the heat pump cycle comprising:

a compressor sucking, compressing and discharging a refrigerant;

a first usage side heat exchanger making a high pressure refrigerant discharged from a discharge port of the compressor exchange heat with air to be blown into a space to be air-conditioned or exchange heat with a heating medium for heating the air:

a first pressure reducing portion configured to reduce pressure of the refrigerant flowing out of the first usage side heat exchanger;

a gas-liquid separation portion separating gas and liquid of the refrigerant having passed through the first pressure reducing portion;

a second pressure reducing portion configured to reduce pressure of a liquid-phase refrigerant separated by the gas-liquid separation portion;

an outside heat exchanger making the refrigerant passing the second pressure reducing portion exchange heat with an outside air;

a second usage side heat exchanger making the refrigerant exchange heat with the air to be blown into the space and making the refrigerant flow out toward a suction port of the compressor;

a third pressure reducing portion reducing pressure of the refrigerant flowing into the second usage side heat exchanger;

an intermediate pressure refrigerant passage guiding a gas-phase refrigerant separated by the gas-liquid separation portion to an intermediate pressure port provided in the compressor to thereby mix the gas-phase refrigerant with the refrigerant in a compression process of the compressor;

a refrigerant flow passage switching device switching a refrigerant flow passage of the refrigerant circulated in the cycle; and an accumulator for separating gas and liquid of the refrigerant flowing toward the suction port of the compressor and for causing a separated gas-phase refrigerant to flow into a side of the suction port of the compressor, wherein each of the first pressure reducing portion and the second pressure reducing portion is configured to be set not only in a throttled state in which each of the first pressure reducing portion and the second pressure reducing portion performs a pressure reducing operation but also in a fully open state in which each of the first pressure reducing portion and the second pressure reducing portion does not perform the pressure reducing operation;

the gas-liquid separation portion has a liquid-phase refrigerant outlet through which the liquid-phase refrigerant just after separation is made to flow out, and an inner volume of the gas-liquid separation portion is smaller than a volume of an excess refrigerant, which is acquired by subtracting a necessary maximum refrigerant volume when an amount of refrigerant necessary for the cycle to perform a maximum capacity is converted into a liquid-phase refrigerant, from a volume of a charged refrigerant when an amount of refrigerant charged into the cycle is converted into a liquid-phase refrigerant.

19. The heat pump cycle as in claim 18,
wherein the liquid-phase refrigerant outlet is opened and closed by a float valve that is displaced according to a height of a liquid level of the liquid-phase refrigerant in the gas-liquid separation portion.

20. The heat pump cycle as in claim 18,
wherein the gas-liquid separation portion is a surface-tension type gas-liquid separator in which gas and liquid of the refrigerant is separated by using a surface tension of the liquid-phase refrigerant.

21. A heat pump cycle capable of switching an operation mode to a cooling operation mode, a heating operation mode, and a dehumidifying-heating operation mode, and applicable to an air conditioning device, the heat pump cycle comprising:

a compressor sucking, compressing and discharging a refrigerant;

a first usage side heat exchanger making a high pressure refrigerant discharged from a discharge port of the compressor exchange heat with air to be blown into a space to be air-conditioned or exchange heat with a heating medium for heating the air:

a first pressure reducing portion configured to reduce pressure of the refrigerant flowing out of the first usage side heat exchanger;

a gas-liquid separation portion separating gas and liquid of the refrigerant having passed through the first pressure reducing portion;

a second pressure reducing portion configured to reduce pressure of a liquid-phase refrigerant separated by the gas-liquid separation portion;

an outside heat exchanger making the refrigerant passing the second pressure reducing portion exchange heat with an outside air;

a second usage side heat exchanger making the refrigerant exchange heat with the air to be blown into the space and making the refrigerant flow out toward a suction port of the compressor;

a third pressure reducing portion reducing pressure of the refrigerant flowing into the second usage side heat exchanger;

an intermediate pressure refrigerant passage guiding a gas-phase refrigerant separated by the gas-liquid separation portion to an intermediate pressure port provided in the compressor to thereby mix the gas-phase refrigerant with the refrigerant in a compression process of the compressor; and a refrigerant flow passage switching device switching a refrigerant flow passage of the refrigerant circulated in the cycle, wherein each of the first pressure reducing portion and the second pressure reducing portion is configured to be set not only in a throttled state in which each of the first pressure reducing portion and the second pressure reducing portion performs a pressure reducing operation but also in a fully open state in which each of the first pressure reducing portion and the second pressure reducing portion does not perform the pressure reducing operation; and a quality fraction dryness of the refrigerant flowing into the outside heat exchanger is 0.1 or less in a heating operation mode.

22. The heat pump cycle as in claim 21,
wherein the second pressure reducing portion is a fixed throttle made of a nozzle or an orifice.

\* \* \* \* \*